US012378900B1

(12) United States Patent
Shimmyo et al.

(10) Patent No.: US 12,378,900 B1
(45) Date of Patent: Aug. 5, 2025

(54) EXHAUST SYSTEM AND GAS TURBINE EQUIPPED WITH SAME

(71) Applicant: MITSUBISHI HEAVY INDUSTRIES, LTD., Tokyo (JP)

(72) Inventors: Tetsuya Shimmyo, Tokyo (JP); Shinya Hashimoto, Tokyo (JP); Norihiko Nagai, Tokyo (JP); Shingo Yamasue, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 19/078,918

(22) Filed: Mar. 13, 2025

(30) Foreign Application Priority Data

Mar. 18, 2024 (JP) ................................ 2024-042420

(51) Int. Cl.
*F01D 25/30* (2006.01)
*F01D 25/24* (2006.01)

(52) U.S. Cl.
CPC .......... *F01D 25/30* (2013.01); *F01D 25/243* (2013.01); *F05D 2240/55* (2013.01)

(58) Field of Classification Search
CPC .............................. F01D 25/30; F01D 25/243
See application file for complete search history.

(56) References Cited

U.S. PATENT DOCUMENTS

| | | | | |
|---|---|---|---|---|
| 8,800,300 | B2 * | 8/2014 | Hashimoto | F02C 7/20 60/770 |
| 9,206,705 | B2 * | 12/2015 | Hashimoto | F01D 11/003 |
| 2013/0236305 | A1 | 9/2013 | Hashimoto et al. | |
| 2019/0048745 | A1 | 2/2019 | Jakubczak et al. | |

FOREIGN PATENT DOCUMENTS

| | | |
|---|---|---|
| JP | 2019-60336 | 4/2019 |
| WO | 2013/132692 | 9/2013 |

* cited by examiner

*Primary Examiner* — Sabbir Hasan
(74) *Attorney, Agent, or Firm* — Wenderoth, Lind & Ponack, L.L.P.

(57) ABSTRACT

An exhaust system includes, a first outer diffuser, a second outer diffuser, an exhaust casing covering an outer circumferential side of the first outer diffuser, an exhaust chamber covering an outer side of the second outer diffuser, a first annular seal device, a second annular seal device, and a third annular seal device. The first annular seal device is disposed to suppress an inflow of an exhaust gas into a space between the first outer diffuser and the exhaust casing, and the second annular seal device is disposed to suppress an inflow of the exhaust gas into a space between the second outer diffuser and the exhaust chamber. The third annular seal device is disposed between the first annular seal device and the second annular seal device, and is disposed to suppress a flow of the exhaust gas to a side of the first annular seal device.

11 Claims, 14 Drawing Sheets

EXHAUST SYSTEM AND GAS TURBINE EQUIPPED WITH SAME

BACKGROUND OF THE INVENTION

Field of the Invention

The present invention relates to an exhaust system forming an exhaust flow path through which an exhaust gas which has rotated a turbine rotor of a gas turbine passes, and a gas turbine equipped with the exhaust system.

Priority is claimed on Japanese Patent Application No. 2024-042420, filed Mar. 18, 2024, the content of which is incorporated herein by reference.

Description of Related Art

A gas turbine includes a compressor compressing outside air to generate a compressed air, a combustor mixing fuel with the compressed air and burning it to generate a combustion gas, a turbine driven by the combustion gas, and an exhaust system. The turbine includes a turbine rotor that is rotatable around an axis, and a turbine casing that covers an outer circumference of the turbine rotor. The turbine rotor includes a rotor shaft extending in an axial direction with the axis as a center, and a plurality of turbine blade rows attached to the rotor shaft. The plurality of turbine blade rows are aligned in the axial direction at a distance from each other in the axial direction. The plurality of turbine blade rows each have a plurality of turbine blades aligned in a circumferential direction with respect to the axis.

The exhaust system is a system that defines an exhaust flow path through which an exhaust gas, which is a combustion gas that has passed through the plurality of turbine blade rows of the turbine rotor, passes. The exhaust system includes a first outer diffuser, a second outer diffuser, an exhaust casing, an exhaust chamber, a first annular seal device, and a second annular seal device as described in, for example, Patent Document 1 below.

The first outer diffuser has a cylindrical shape centered on the axis and defines an edge on a radial outer side of an upstream portion of the exhaust flow path. The first outer diffuser covers an outer circumference of a portion of the turbine rotor on an axial downstream side in which a turbine blade row is not present. The exhaust casing has a cylindrical shape centered on the axis and covers an outer circumferential side of the first outer diffuser. The first outer diffuser and the exhaust casing are both connected to an end of the turbine casing on an axial downstream side. The second outer diffuser has a cylindrical shape centered on the axis and defines an end on a radial outer side of a downstream portion of the exhaust flow path. The exhaust chamber has a cylindrical shape centered on the axis and covers an outer circumferential side of the second outer diffuser. The second outer diffuser is disposed on an axial downstream side of the first outer diffuser with a gap therebetween to allow for thermal expansion of the first outer diffuser in the axial direction.

The first annular seal device is provided from an end part of the first outer diffuser on the axial downstream side to an end part of the exhaust casing on the axial downstream side to suppress an inflow of the exhaust gas into a space between the first outer diffuser and the exhaust casing. That is, the first annular seal device serves to seal between a first outer space between an inner circumferential side of the exhaust casing and an outer circumferential side of the first outer diffuser, and the exhaust flow path. The second annular seal device is provided from an end part of the second outer diffuser on an axial upstream side to an end part of the exhaust chamber on the axial upstream side to suppress an inflow of the exhaust gas into a space between the second outer diffuser and the exhaust chamber. That is, the second annular seal device serves to seal between a second outer space between an inner circumferential side of the exhaust chamber and an outer circumferential side of the second outer diffuser, and the exhaust flow path.

PATENT DOCUMENTS

[Patent Document 1] PCT International Publication No. WO 2013/132692

SUMMARY OF THE INVENTION

In recent years, a temperature of combustion gas has been increased to improve efficiency of gas turbines. Therefore, a likelihood of thermal damage to the first annular seal device or the second annular seal device is increasing. If it is assumed that the first annular seal device is damaged, a high-temperature exhaust gas flows into the first outer space, a cooling effect of the first outer diffuser by an air present in the first outer space is significantly reduced, and there is a likelihood that the first outer diffuser will also be thermally damaged.

Therefore, an objective of the present disclosure is to provide an exhaust system and a gas turbine equipped with the same capable of suppressing an inflow of an exhaust gas into a space between an inner circumferential side of an exhaust casing and an outer circumferential side of a first outer diffuser, or an inflow of an exhaust gas into a space between an inner circumferential side of an exhaust chamber and an outer circumferential side of a second outer diffuser.

An exhaust system as one aspect according to the invention for achieving the above-described objective includes a first outer diffuser having a cylindrical shape centered on an axis and defining an edge on a radial outer side of an upstream portion of an exhaust flow path through which an exhaust gas which has rotated a turbine rotor passes, a second outer diffuser disposed on an axial downstream side, between an axial upstream side and the axial downstream side, of the first outer diffuser with a gap therebetween in an axial direction in which the axis extends, having a cylindrical shape centered on the axis, and defining an edge on the radial outer side of a downstream portion of the exhaust flow path through which the exhaust gas having passed through the inside of the first outer diffuser passes, an exhaust casing having a cylindrical shape centered on the axis and covering an outer circumferential side of the first outer diffuser, an exhaust chamber having a cylindrical shape centered on the axis and covering an outer side of the second outer diffuser, a first annular seal device having an annular shape centered on the axis, a second annular seal device having an annular shape centered on the axis, and a third annular seal device having an annular shape centered on the axis. The exhaust casing includes an exhaust casing main body having a cylindrical shape centered on the axis, and an exhaust casing flange extending from an end of the exhaust casing main body on the axial downstream side to the radial outer side with respect to the axis. The exhaust chamber includes an exhaust chamber main body having a cylindrical shape centered on the axis, and an exhaust chamber flange extending from an end of the exhaust chamber main body on the axial upstream side to the radial outer side to be connected to the exhaust casing flange. The first annular seal device is provided in the first outer diffuser to suppress an inflow of the exhaust gas into a first outer space between the first outer diffuser and the exhaust casing main body. The second annular seal device is provided in the second outer diffuser to suppress an inflow of the exhaust gas into a second outer space between the second outer diffuser and the exhaust chamber main body. The third annular seal device is disposed between the first annular seal device and the second annular seal device in the axial direction. The third annular seal device is provided at an end of the first outer diffuser on the axial downstream side to suppress a flow of the exhaust gas to a side of the first annular seal device, or is provided at an end of the second outer diffuser on the axial upstream side to suppress a flow of the exhaust gas to a side of the second annular seal device.

In the present aspect, an inflow of the exhaust gas to the first outer space can be suppressed by the first annular seal device, and an inflow of the exhaust gas into the second outer space can be suppressed by the second annular seal device.

Further, in the present aspect, a flow of the exhaust gas to a side of the first annular seal device or a flow of the exhaust gas to a side of the second annular seal device can be suppressed by the third annular seal device. That is, in the present aspect, the inflow of the exhaust gas into the first outer space can be suppressed by the two seal devices, the first annular seal device and the third annular seal device, or the inflow of the exhaust gas into the second outer space can be suppressed by the two seal devices, the second annular seal device and the third annular seal device.

If it is assumed that a high-temperature exhaust gas has flowed into the first outer space, a cooling effect of the first outer diffuser by an air present in the first outer space is significantly reduced, and the first outer diffuser may suffer thermal damage.

In the present aspect, even if the third annular seal device is assumed to suffer thermal damage by heat of the exhaust gas, the inflow of the exhaust gas into the first outer space can be suppressed by the first annular seal device. Therefore, in the present aspect, it is possible to suppress thermal damage to the first outer diffuser caused by the inflow of the high-temperature exhaust gas into the first outer space. Alternatively, in the present aspect, for similar reasons, it is possible to suppress thermal damage to the second outer diffuser caused by the inflow of the high-temperature exhaust gas into the second outer space.

As a plant including a gas turbine, there are plants that include a heat recovery boiler which generates steam by utilizing heat of the exhaust gas exhausted from the gas turbine. In this case, in the present aspect, it is possible to suppress decrease in an amount of the exhaust gas supplied to the heat recovery boiler caused by leakage of the exhaust gas from the exhaust flow path.

A gas turbine as one aspect according to the invention for achieving the above-described objective includes an exhaust system according to the one aspect, a compressor being able to compress air to generate a compressed air, a combustor being able to burn fuel in the compressed air to generate a combustion gas, and a turbine being able to be driven by the combustion gas from the combustor. The turbine includes a turbine rotor rotatable around the axis, and a turbine casing covering an outer circumference of the turbine rotor. The turbine rotor includes a rotor shaft extending in the axial direction with the axis as a center, and a plurality of turbine blade rows aligned in the axial direction at intervals in the axial direction and attached to the rotor shaft. The turbine casing covers an outer circumference of a portion of the turbine rotor in which the plurality of turbine blade rows are present. The exhaust casing of the exhaust system is connected to an end of the turbine casing on the axial downstream side.

In the present disclosure, it is possible to suppress an inflow of an exhaust gas into a space between an inner circumferential side of the exhaust casing and an outer circumferential side of the first outer diffuser, or an inflow of the exhaust gas into a space between an inner circumferential side of the exhaust chamber and an outer circumferential side of the second outer diffuser.

DETAILED DESCRIPTION OF THE INVENTION

Hereinafter, one embodiment of a gas turbine according to the present invention will be described in detail with reference to FIGS. 1 to 10.

Figure 1:
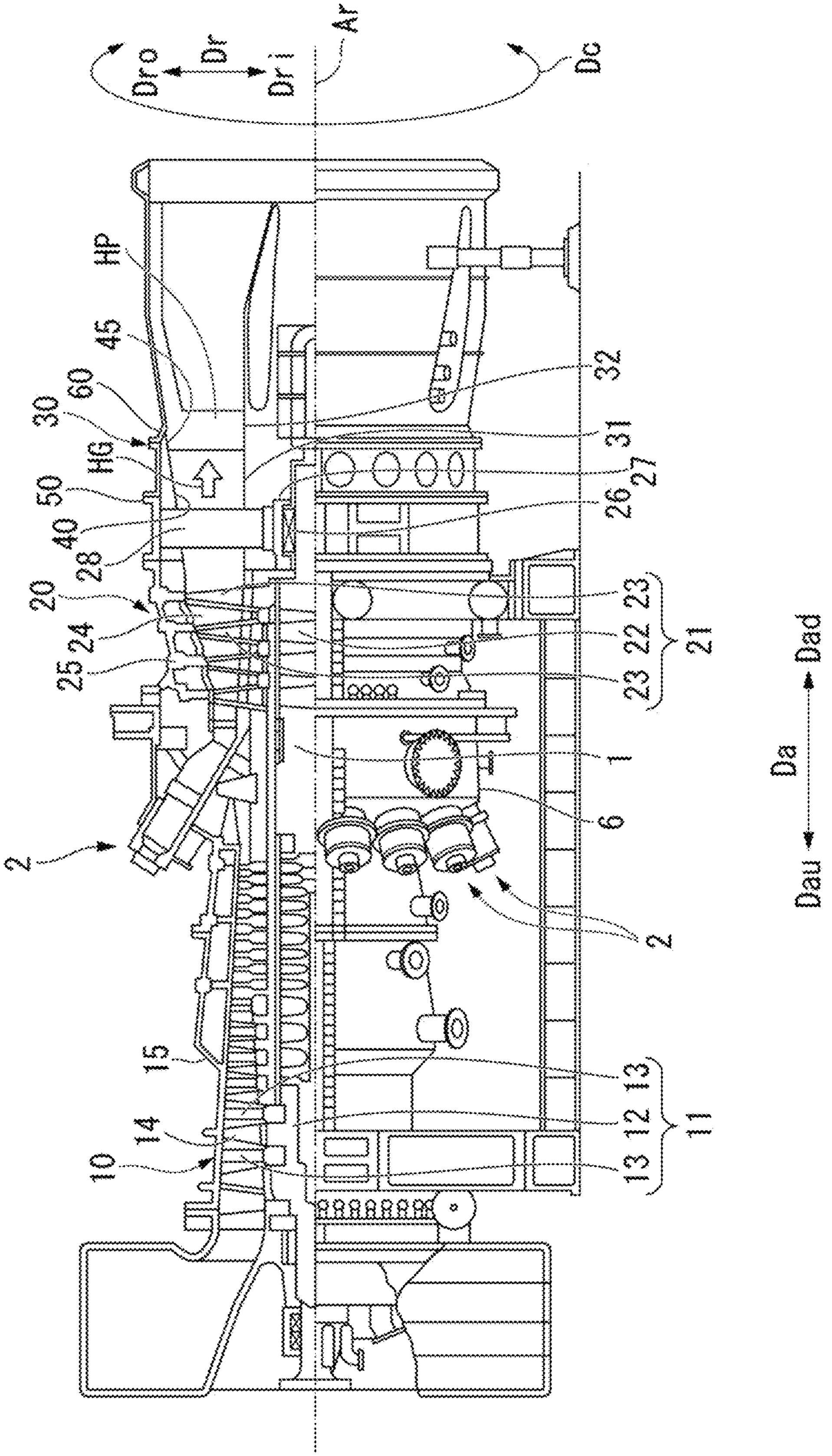
FIG. 1 is a cutaway side view of a main portion of a gas turbine in one embodiment according to the present disclosure.

As illustrated in FIG. 1, the gas turbine of the present embodiment includes a compressor 10 capable of compressing outside air to generate a compressed air, a combustor 2 capable of burning fuel from a fuel supply source in the compressed air to generate a combustion gas, a turbine 20 that can be driven by the combustion gas, and an exhaust system 30.

The compressor 10 includes a compressor rotor 11 rotating around an axis Ar, a compressor casing 15 covering the compressor rotor 11, and a plurality of compressor vane rows 14. The turbine 20 includes a turbine rotor 21 rotating around the axis Ar, a turbine casing 25 covering the turbine rotor 21, and a plurality of turbine vane rows 24. Further, in the following description, a direction in which the axis Ar extends is referred to as an axial direction Da, a circumferential direction centered on the axis Ar is simply referred to as a circumferential direction Dc, and a direction perpendicular to the axis Ar is referred to as a radial direction Dr. Also, one side in the axial direction Da is referred to as an axial upstream side Dau, and a side opposite thereto is referred to as an axial downstream side Dad. Also, a side toward the axis Ar in the radial direction Dr is referred to as a radial inner side Dri, and a side opposite thereto is referred to as a radial outer side Dro.

The compressor 10 is disposed on the axial upstream side Dau with respect to the turbine 20.

The compressor rotor 11 and the turbine rotor 21 are positioned on the same axis Ar and are connected to each other to form a gas turbine rotor 1. For example, a rotor of a generator is connected to the gas turbine rotor 1. The gas turbine further includes an intermediate casing 6. The intermediate casing 6 is disposed between the compressor casing 15 and the turbine casing 25 in the axial direction Da. The combustor 2 is provided in the intermediate casing 6. The compressor casing 15, the intermediate casing 6, and the turbine casing 25 are connected to each other.

The compressor rotor 11 includes a rotor shaft 12 extending in the axial direction Da with the axis Ar as a center, and a plurality of compressor blade rows 13 attached to the rotor shaft 12. The plurality of compressor blade rows 13 are aligned in the axial direction Da. The compressor blade rows 13 are each constituted by a plurality of compressor blades aligned in the circumferential direction Dc. On the axial downstream side Dad of each of the plurality of compressor blade rows 13, one of the plurality of compressor vane rows 14 is disposed. Each of the compressor vane rows 14 is provided on an inner side of the compressor casing 15. Each compressor vane row 14 is constituted by a plurality of compressor vanes aligned in the circumferential direction Dc.

The turbine rotor 21 includes a rotor shaft 22 extending in the axial direction Da with the axis Ar as a center, and a plurality of turbine blade rows 23 attached to the rotor shaft 22. The plurality of turbine blade rows 23 are aligned in the axial direction Da. The turbine blade rows 23 are each constituted by a plurality of turbine blades aligned in the circumferential direction Dc. On the axial upstream side Dau of each of the plurality of turbine blade rows 23, one of the plurality of turbine vane rows 24 is disposed. Each of the turbine vane rows 24 is provided on an inner side of the turbine casing 25. Each of the turbine vane rows 24 is constituted by a plurality of turbine vanes aligned in the circumferential direction Dc.

An annular space, in which the turbine blade rows 23 and the turbine vane rows 24 are disposed in the axial direction Da, between an outer circumferential side of the rotor shaft 22 and an inner circumferential side of the turbine casing 25, forms a combustion gas flow path through which a combustion gas from the combustor 2 flows.

The exhaust system 30 is disposed on the axial downstream side Dad of the turbine casing 25. The exhaust system 30 is a system that defines an exhaust flow path HP through which an exhaust gas HG, which is a combustion gas that has passed through the plurality of turbine blade rows 23 of the turbine rotor 21, passes. The exhaust flow path HP forms an annular shape centered on the axis Ar and extends in the axial direction Da.

Figure 2:
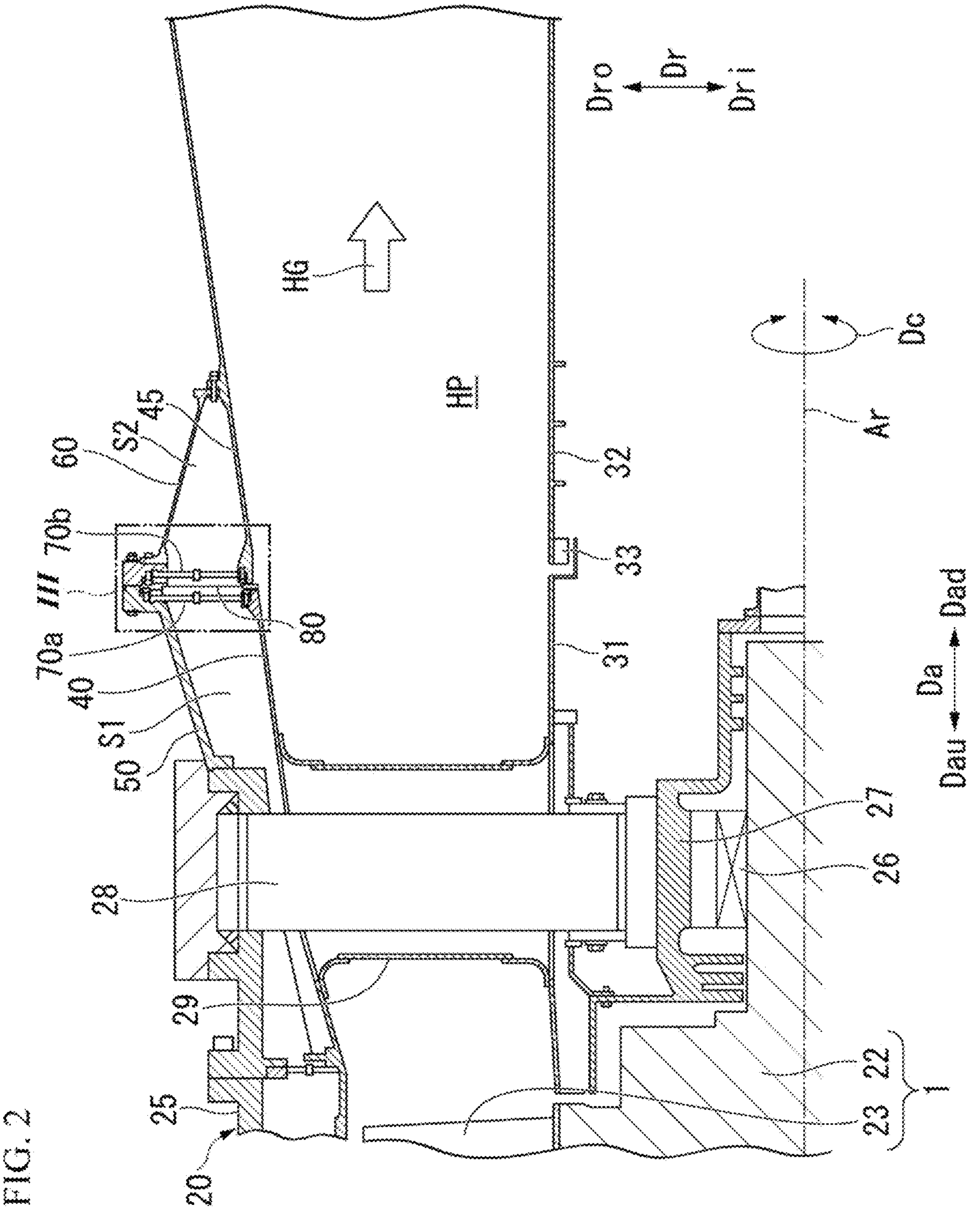
FIG. 2 is a cross-sectional view of a main portion of the gas turbine in one embodiment according to the present disclosure.

As illustrated in FIG. 2, the exhaust system 30 includes a first inner diffuser 31, a first outer diffuser 40, a second inner diffuser 32, a second outer diffuser 45, an exhaust casing 50, an exhaust chamber 60, a first annular seal device **70*a*, a second annular seal device 70*b*, and a third annular seal device 80**.

The first inner diffuser 31 has a cylindrical shape centered on the axis Ar, and defines an edge on the radial inner side Dri of an upstream portion of the exhaust flow path HP. The first inner diffuser 31 covers an outer circumference of a portion of the turbine rotor 21 on the axial downstream side Dad in which the turbine blade row 23 is not present.

The first outer diffuser 40 has a cylindrical shape centered on the axis Ar, and defines an edge on the radial outer side Dro of the upstream portion of the exhaust flow path HP. Therefore, the first outer diffuser 40 is disposed on an outer circumferential side of the first inner diffuser 31. The exhaust casing 50 has a cylindrical shape centered on the axis Ar, and covers an outer circumferential side of the first outer diffuser 40. The exhaust casing 50 is connected to an end of the turbine casing 25 on the axial downstream side Dad. Also, the first outer diffuser 40 is indirectly connected to the end of the turbine casing 25 on the axial downstream side Dad. A space between an inner circumferential side of the exhaust casing 50 and an outer circumferential side of the first outer diffuser 40 forms a first outer space S1 into which cooling air can flow.

A bearing 26 rotatably supporting a portion of the turbine rotor 21 on the axial downstream side Dad on which the turbine blade row 23 is not provided, and a bearing box 27 covering an outer circumferential side of the bearing 26 and supporting the bearing 26 are provided on an inner circumferential side of the first inner diffuser 31. The exhaust casing 50 and the bearing box 27 are connected by a plurality of struts 28 that penetrate the first outer diffuser 40 and the first inner diffuser 31. The plurality of struts 28 are aligned in the circumferential direction Dc at intervals from each other in the circumferential direction Dc. The exhaust gas HG flows between the plurality of struts 28. The struts 28 are each covered with a strut cover 29 in an extension direction thereof. One end part of the strut cover 29 in the extension direction is attached to the first outer diffuser 40, and the other end part is attached to the first inner diffuser 31.

The second inner diffuser 32 has a cylindrical shape centered on the axis Ar, and defines an edge on the radial inner side Dri of a downstream portion of the exhaust flow path HP. The second inner diffuser 32 is disposed on the axial downstream side Dad of the first inner diffuser 31 with a gap therebetween to allow for thermal expansion of the first inner diffuser 31 in the axial direction Da. A seal device 33 is provided between the first inner diffuser 31 and the second inner diffuser 32 to suppress the exhaust gas HG leaking out of the exhaust flow path HP from therebetween.

The second outer diffuser 45 has a cylindrical shape centered on the axis Ar, and defines an edge on the radial outer side Dro of the downstream portion of the exhaust flow path HP. Therefore, the second outer diffuser 45 is disposed on an outer circumferential side of the second inner diffuser 32.

The second outer diffuser 45 is disposed on the axial downstream side Dad of the first outer diffuser 40 with a gap therebetween to allow for thermal expansion of the first outer diffuser 40 in the axial direction Da. The exhaust chamber 60 has a cylindrical shape centered on the axis Ar, and covers an outer circumferential side of the second outer diffuser 45. An end of the exhaust chamber 60 on the axial upstream side Dau is connected to an end of the exhaust casing 50 on the axial downstream side Dad. A space between an inner circumferential side of the exhaust chamber 60 and an outer circumferential side of the second outer diffuser 45 forms a second outer space S2.

The first annular seal device 70*a*, the second annular seal device 70*b*, and the third annular seal device 80 are all have an annular shape with the axis Ar as a center.

The first annular seal device 70*a* is provided from an end part of the first outer diffuser 40 on the axial downstream side Dad to an end part of the exhaust casing 50 on the axial downstream side Dad to suppress an inflow of the exhaust gas HG into the first outer space S1 between the first outer diffuser 40 and the exhaust casing 50. That is, the first annular seal device 70*a* serves to seal between the first outer space S1 and the exhaust flow path HP. The second annular seal device 70*b* is provided from an end part of the second outer diffuser 45 on the axial upstream side Dau to an end part of the exhaust chamber 60 on the axial upstream side Dau to suppress a flow of the exhaust gas HG into the second outer space S2 between the second outer diffuser 45 and the exhaust chamber 60. That is, the second annular seal device 70*b* serves to seal between the second outer space S2 and the exhaust flow path HP. The third annular seal device 80 is disposed between the first annular seal device 70*a* and the second annular seal device 70*b* in the axial direction Da, and serves to suppress a flow of the exhaust gas HG to a side of the first annular seal device 70*a*.

Figure 3:
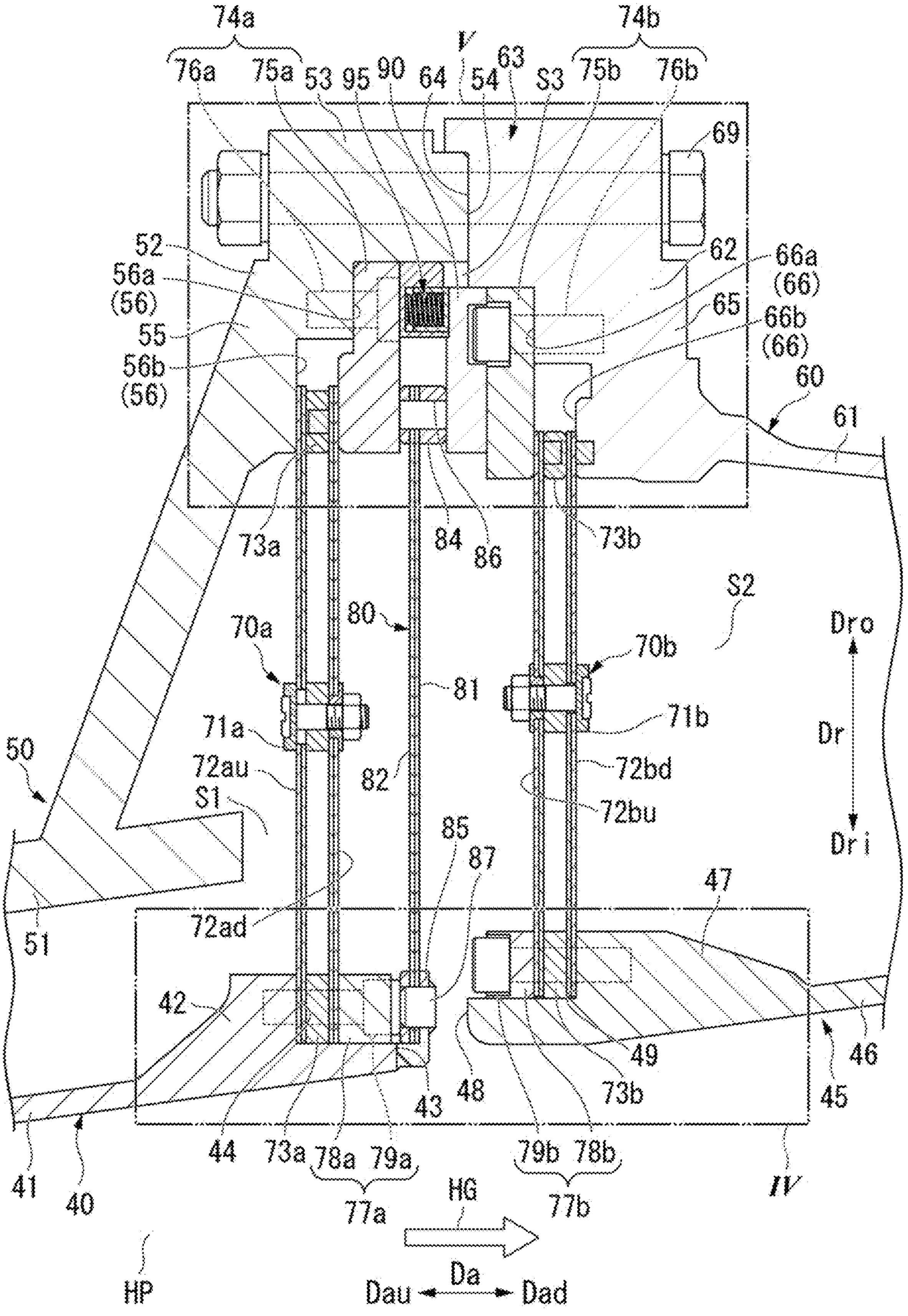
FIG. 3 is an enlarged view of portion III in FIG. 2.
Figure 5:
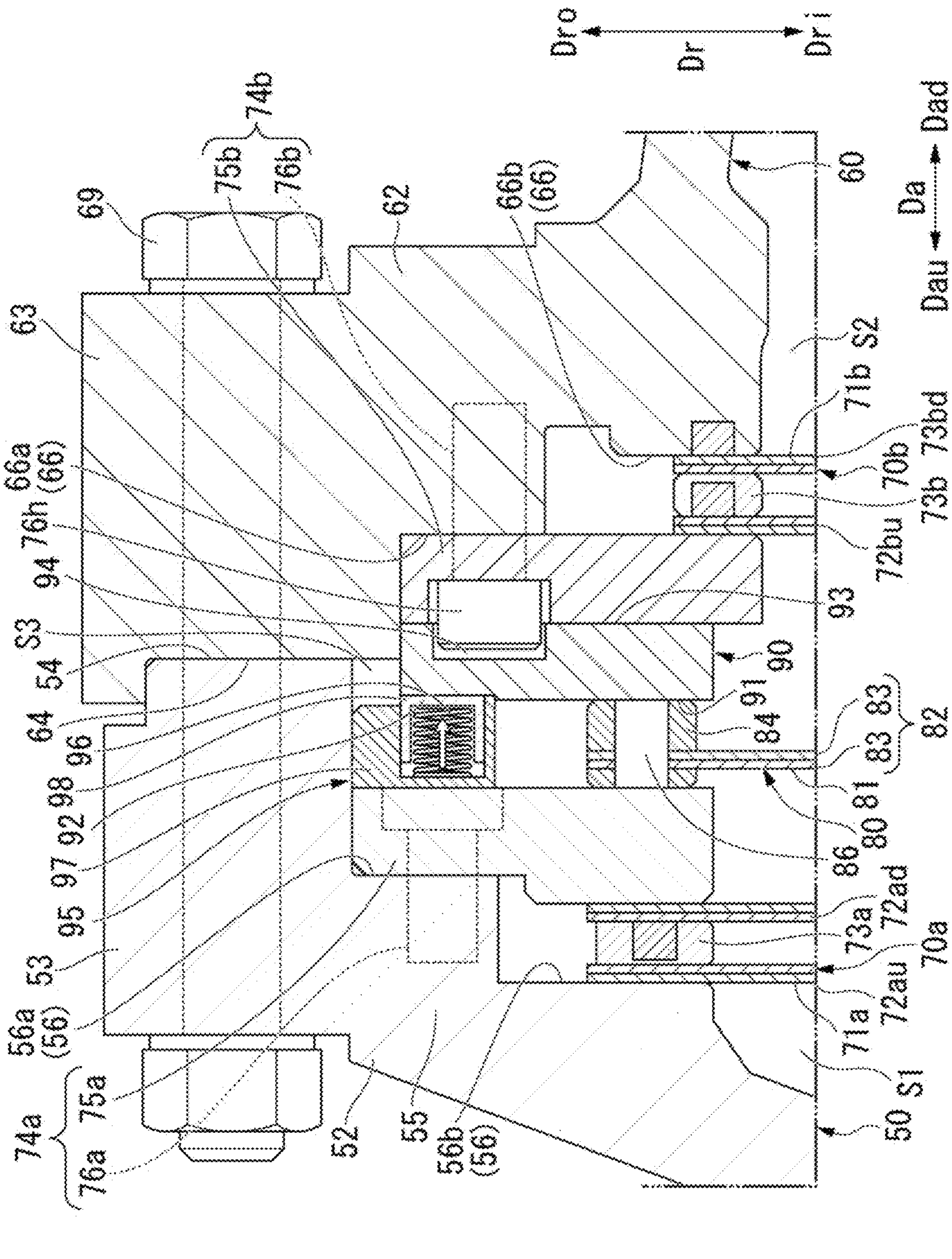
FIG. 5 is an enlarged view of portion V in FIG. 3.

As illustrated in FIGS. 3 and 5, the exhaust casing 50 includes an exhaust casing main body 51 having a cylindrical shape centered on the axis Ar, and an exhaust casing flange 52 extending to the radial outer side Dro from an end of the exhaust casing main body 51 on the axial downstream side Dad. The exhaust casing flange 52 includes a connection portion 53 having a disc shape centered on the axis Ar, and a relief portion 55 having a disc shape centered on the axis Ar and connected to an inner circumferential side of the connection portion 53. The connection portion 53 has an exhaust casing contact surface 54 facing the axial downstream side Dad and in contact with the exhaust chamber 60. The relief portion 55 has an exhaust casing relief surface 56 positioned on the radial inner side Dri and the axial upstream side Dau with respect to the exhaust casing contact surface 54. The exhaust casing relief surface 56 has a first exhaust casing relief surface 56*a* and a second exhaust casing relief surface 56*b* which is positioned on the radial inner side Dri and the axial upstream side Dau with respect to the first exhaust casing relief surface 56*a*.

Figure 4:
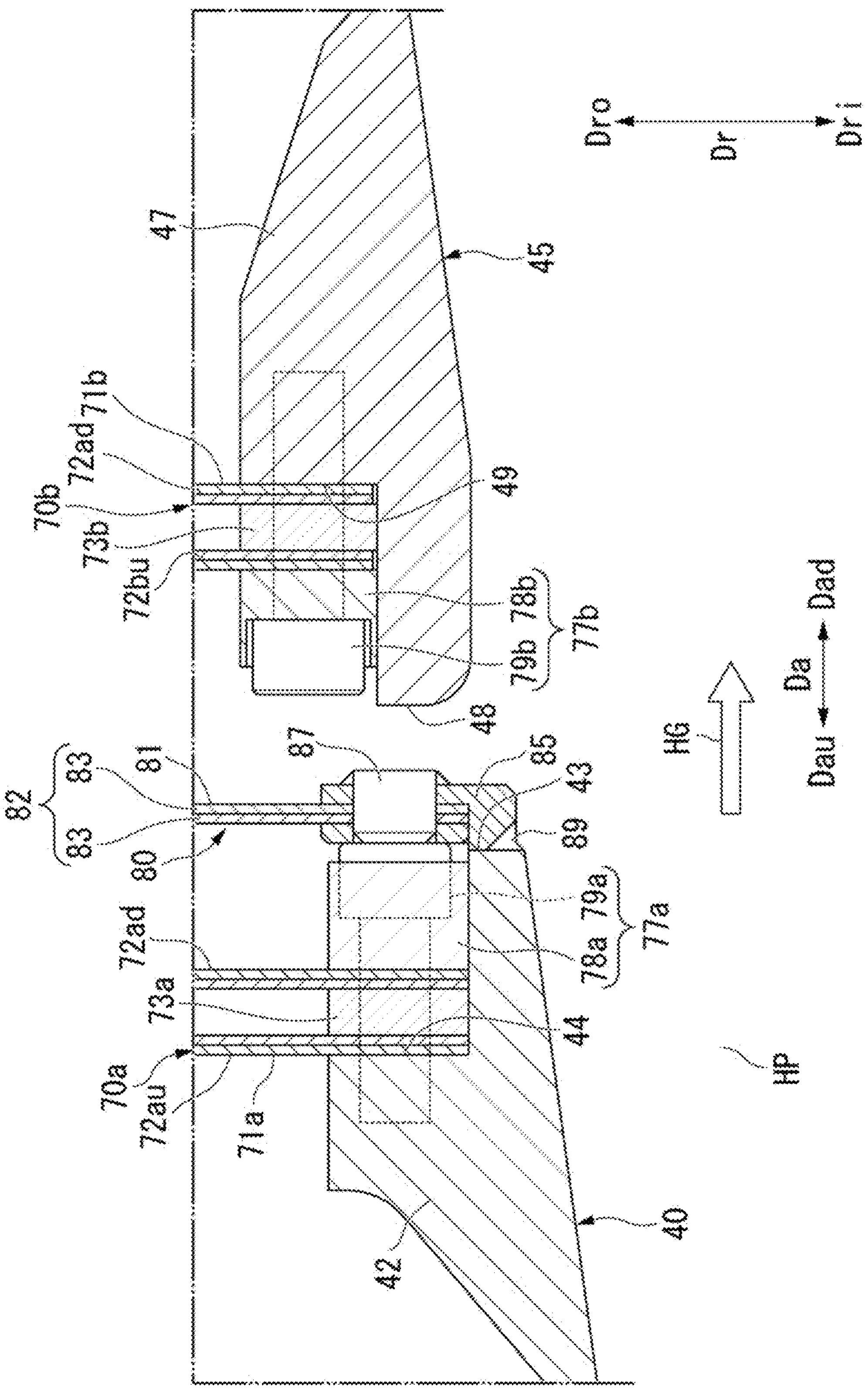
FIG. 4 is an enlarged view of portion IV in FIG. 3.

As illustrated in FIGS. 3 and 4, the first outer diffuser 40 includes a first outer diffuser main body 41 having a cylindrical shape centered on the axis Ar, and a first outer diffuser end portion 42 provided at an end of the first outer diffuser main body 41 on the axial downstream side Dad. The first outer diffuser end portion 42 has a first outer diffuser end surface 43 positioned on the most axial downstream side Dad in the first outer diffuser 40 and facing the axial downstream side Dad, and a seal receiving surface 44 positioned on the axial upstream side Dau and the radial outer side Dro with respect to the first outer diffuser end surface 43 and facing the axial downstream side Dad.

As illustrated in FIGS. 3 and 5, the exhaust chamber 60 includes an exhaust chamber main body 61 having a cylindrical shape centered on the axis Ar, and an exhaust chamber flange 62 extending from an end on the axial upstream side Dau of the exhaust chamber main body 61 to the radial outer side Dro. The exhaust chamber flange 62 includes a connection portion 63 having a disc shape centered on the axis Ar, and a relief portion 65 having a disc shape centered on the axis Ar and connected to an inner circumferential side of the connection portion 63. The connection portion 63 has an exhaust chamber contact surface 64 facing the axial upstream side Dau and in contact with the exhaust casing contact surface 54. The connection portion 63 of the exhaust chamber flange 62 is connected to the connection portion 53 of the exhaust casing flange 52 by a flange connection bolt 69. The relief portion 65 has an exhaust chamber relief surface 66 positioned on the radial inner side Dri and the axial downstream side Dad with respect to the exhaust chamber contact surface 64 and facing the exhaust casing relief surface 56 with a gap therebetween in the axial direction Da. The exhaust chamber relief surface 66 has a first exhaust chamber relief surface 66*a* and a second exhaust chamber relief surface 66*b* which is positioned on the radial inner side Dri and the axial downstream side Dad with respect to the first exhaust chamber relief surface 66*a*.

As illustrated in FIGS. 3 and 4, the second outer diffuser 45 includes a second outer diffuser main body 46 having a cylindrical shape centered on the axis Ar, and a second outer diffuser end portion 47 provided at an end of the second outer diffuser main body 46 on the axial upstream side Dau. The second outer diffuser end portion 47 has a second outer diffuser end surface 48 positioned on the most axial upstream side Dau in the second outer diffuser 45 and facing the axial upstream side Dau, and a seal receiving surface 49 positioned on the axial downstream side Dad and the radial outer side Dro with respect to the second outer diffuser end surface 48 and facing the axial upstream side Dau. As described above, the second outer diffuser 45 is disposed on the axial downstream side Dad of the first outer diffuser 40 with a gap therebetween. Therefore, there is a gap between the first outer diffuser end surface 43 and the second outer diffuser end surface 48 in the axial direction Da.

The first annular seal device 70*a* includes a plurality of first seal assemblies 71*a* aligned in the circumferential direction Dc, a plurality of first outer attachment fittings 74*a* aligned in the circumferential direction Dc, and a plurality of first inner attachment fittings 77*a* aligned in the circumferential direction Dc.

As illustrated in FIGS. 3 to 5, the plurality of first seal assemblies 71*a* each include a downstream seal plate group 72*ad*, an upstream seal plate group 72*au*, and a spacer 73*a*. The downstream seal plate group 72*ad* and the upstream seal plate group 72*au* are both bundles of seal plates in which a plurality of seal plates extending in the radial direction Dr and the circumferential direction Dc are stacked in the axial direction Da. The downstream seal plate group 72*ad* is positioned on the axial downstream side Dad with respect to the upstream seal plate group 72*au*.

The spacer 73*a* is disposed between the downstream seal plate group 72*ad* and the upstream seal plate group 72*au* in the axial direction Da and maintains a distance between the downstream seal plate group 72*ad* and the upstream seal plate group 72*au* in the axial direction Da. A portion on the radial outer side Dro side of the upstream seal plate group 72*au* of each of the plurality of first seal assemblies 71*a* is in contact with the second exhaust casing relief surface 56*b* of the exhaust casing flange 52. Also, a portion on the radial inner side Dri of the upstream seal plate group 72*au* of each of the plurality of first seal assemblies 71*a* is in contact with the seal receiving surface 44 of the first outer diffuser end portion 42.

The first outer attachment fitting 74*a* includes a first outer pressing plate 75*a* pressing a portion of the first seal assembly 71*a* on the radial outer side Dro against the second exhaust casing relief surface 56*b* of the exhaust casing flange 52, and a first outer attachment bolt 76*a* attaching the first outer pressing plate 75*a* to the exhaust casing flange 52. The first outer pressing plate 75*a* is in contact with the portion of the first seal assembly 71*a* on the radial outer side Dro and the first exhaust casing relief surface 56*a* of the exhaust casing flange 52. The portion of the first seal assembly 71*a* on the radial outer side Dro is sandwiched between the first outer pressing plate 75*a* and the second exhaust casing relief surface 56*b* of the exhaust casing flange 52. The first outer attachment bolt 76*a* penetrates a portion of the first outer pressing plate 75*a* in contact with the first exhaust casing relief surface 56*a* in the axial direction Da to be screwed into the exhaust casing flange 52. This first outer attachment bolt 76*a* does not penetrate the first seal assembly 71*a* in the axial direction Da. Therefore, the portion of the first seal assembly 71*a* on the radial outer side Dro sandwiched between the first outer pressing plate 75*a* and the second exhaust casing relief surface 56*b* of the exhaust casing flange 52 is movable in the radial direction Dr. Therefore, the first seal assembly 71*a* of the present embodiment is allowed to thermally expand in the radial direction Dr.

The first inner attachment fitting 77*a* includes a first inner pressing plate 78*a* pressing a portion of the first seal assembly 71*a* on the radial inner side Dri against the seal receiving surface 44 of the first outer diffuser end portion 42, and a first inner attachment bolt 79*a* attaching the first inner pressing plate 78*a* to the first outer diffuser end portion 42. The first inner attachment bolt 79*a* penetrates the first inner pressing plate 78*a* and the portion on the radial inner side Dri of the first seal assembly 71*a* in the axial direction Da to be screwed into the first outer diffuser end portion 42.

As described above, in the present embodiment, the first outer pressing plate 75*a* is fixed to the exhaust casing flange 52 using the first outer attachment bolt 76*a* that penetrates the portion of the first outer pressing plate 75*a* in contact with the first exhaust casing relief surface 56*a* in the axial direction Da. Also, in the present embodiment, the first inner pressing plate 78*a* and the portion on the radial inner side Dri of the first seal assembly 71*a* are fixed to the first outer diffuser end portion 42 using the first inner attachment bolt 79*a* that penetrates the first inner pressing plate 78*a* and the portion on the radial inner side Dri of the first seal assembly 71*a* in the axial direction Da. Therefore, in the present embodiment, when the first annular seal device 70*a* is attached, it is necessary to secure a space in which the first outer attachment bolt 76*a* and the first inner attachment bolt 79*a* can be moved in the axial direction Da. Therefore, in the present embodiment, when the first annular seal device 70*a* is attached to an intended position, and when the first annular seal device 70*a* is removed from the intended position, the exhaust chamber 60 is kept separated from the exhaust casing 50 to secure the space described above.

The second annular seal device 70*b* includes a plurality of second seal assemblies 71*b* aligned in the circumferential direction Dc, a plurality of second outer attachment fittings 74*b* aligned in the circumferential direction Dc, and a plurality of second inner attachment fittings 77*b* aligned in the circumferential direction Dc.

The plurality of second seal assemblies 71*b* each include a downstream seal plate group 72*bd*, an upstream seal plate group 72*bu*, and a spacer 73*b*. The downstream seal plate group 72*bd* and the upstream seal plate group 72*bu* are both bundles of seal plates in which a plurality of seal plates extending in the radial direction Dr and the circumferential direction Dc are stacked in the axial direction Da. The downstream seal plate group 72*bd* is positioned on the axial downstream side Dad with respect to the upstream seal plate group 72*bu*. The spacer 73*b* is disposed between the downstream seal plate group 72*bd* and the upstream seal plate group 72*bu* in the axial direction Da and maintains a distance between the downstream seal plate group 72*bd* and the upstream seal plate group 72*bu* in the axial direction Da. A portion of the downstream seal plate group 72*bd* on the radial outer side Dro of each of the plurality of second seal assemblies 71*b* is in contact with the second exhaust chamber relief surface 66*b* of the exhaust chamber flange 62. Also, a portion of the downstream seal plate group 72*bd* on the radial inner side Dri of each of the plurality of second seal assemblies 71*b* is in contact with the seal receiving surface 49 of the second outer diffuser end portion 47.

The second outer attachment fitting 74*b* includes a second outer pressing plate 75*b* pressing a portion of the second seal assembly 71*b* on the radial outer side Dro against the second exhaust chamber relief surface 66*b* of the exhaust chamber flange 62, and a second outer attachment bolt 76*b* attaching the second outer pressing plate 75*b* to the exhaust chamber flange 62. The second outer pressing plate 75*b* is in contact with the portion of the second seal assembly 71*b* on the radial outer side Dro and the first exhaust chamber relief surface 66*a* of the exhaust chamber flange 62. The portion of the second seal assembly 71*b* on the radial outer side Dro is sandwiched between the second outer pressing plate 75*b* and the second exhaust chamber relief surface 66*b* of the exhaust chamber flange 62. The second outer attachment bolt 76*b* penetrates a portion of the second outer pressing plate 75*b* in contact with the first exhaust chamber relief surface 66*a*, and the exhaust chamber flange 62 in the axial direction Da. The second outer attachment bolt 76*b* does not penetrate the second seal assembly 71*b* in the axial direction Da. Therefore, the portion of the second seal assembly 71*b* on the radial outer side Dro sandwiched between the second outer pressing plate 75*b* and the second exhaust chamber relief surface 66*b* of the exhaust chamber flange 62 is movable in the radial direction Dr. Therefore, the second seal assembly 71*b* of the present embodiment is allowed to thermally expand in the radial direction Dr.

The second inner attachment fitting 77*b* includes a second inner pressing plate 78*b* pressing a portion of the second seal assembly 71*b* on the radial inner side Dri against the seal receiving surface 49 of the second outer diffuser end portion 47, and a second inner attachment bolt 79*b* attaching the second inner pressing plate 78*b* to the second outer diffuser end portion 47. The second inner attachment bolt 79*b* penetrates the second inner pressing plate 78*b* and the portion on the radial inner side Dri of the second seal assembly 71*b* in the axial direction Da to be screwed into the second outer diffuser end portion 47.

As described above, in the present embodiment, the second outer pressing plate 75*b* is fixed to the exhaust chamber flange 62 using the second outer attachment bolt 76*b* that penetrates the portion of the second outer pressing plate 75*b* in contact with the first exhaust chamber relief surface 66*a* in the axial direction Da. Also, in the present embodiment, the second inner pressing plate 78*b* and the portion on the radial inner side Dri of the second seal assembly 71*b* are fixed to the second outer diffuser end portion 47 using the second inner attachment bolt 79*b* that penetrates the second inner pressing plate 78*b* and the portion on the radial inner side Dri of the second seal assembly 71*b* in the axial direction Da.

Therefore, in the present embodiment, when the second annular seal device 70*b* is attached, it is necessary to secure a space in which the second outer attachment bolt 76*b* and the second inner attachment bolt 79*b* can be moved in the axial direction Da. Therefore, in the present embodiment, when the second annular seal device 70*b* is attached to an intended position, and when the second annular seal device 70*b* is removed from the intended position, the exhaust chamber 60 is kept separated from the exhaust casing 50 to secure the space described above.

As illustrated in FIGS. 3 to 5, the third annular seal device 80 includes a plurality of third seal assemblies 81 aligned in the circumferential direction Dc, a plurality of spacers 90 aligned in the circumferential direction Dc, and a plurality of spacer movement retainers 95 aligned in the circumferential direction Dc.

The plurality of third seal assemblies 81 each include a seal plate group 82, an outer frame 84 supporting an edge of the seal plate group 82 on the radial outer side Dro, an inner frame 85 supporting an edge of the seal plate group 82 on the radial inner side Dri, an outer pin 86 attaching a portion of the seal plate group 82 on the radial outer side Dro to the outer frame 84, and an inner pin 87 attaching a portion of the seal plate group 82 on the radial inner side Dri to the inner frame 85. The seal plate group 82 is a bundle of the seal plates 83 in which a plurality of seal plates 83 extending in the radial direction Dr and the circumferential direction Dc are stacked in the axial direction Da. The outer pin 86 penetrates the portion of the seal plate group 82 on the radial outer side Dro and the outer frame 84 to be joined to the outer frame 84 by welding. The inner pin 87 penetrates the portion of the seal plate group 82 on the radial outer side Dro and the inner frame 85 to be joined to the inner frame 85 by welding. The outer frame 84 is in contact with the first outer pressing plate 75*a* from the axial downstream side Dad. Also, the inner frame 85 is in contact with the first outer diffuser end surface 43 and joined to the first outer diffuser end surface 43 by welding. Therefore, as illustrated in FIG. 4, there is a welded portion 89 between the inner frame 85 and the first outer diffuser end surface 43.

As illustrated in FIG. 5, the spacer 90 is disposed in a frame-to-relief surface space S3 between the outer frame 84 of the third seal assembly 81 and the exhaust chamber relief surface 66 of the exhaust chamber flange 62, and restricts movement of the outer frame 84 in the axial direction Da while allowing movement of the outer frame 84 in the radial direction Dr. Therefore, the third seal assembly 81 of the present embodiment is allowed to thermally expand in the radial direction Dr. To be precise, the spacer 90 is disposed between the outer frame 84 of the third seal assembly 81 and the second outer pressing plate 75*b* which is attached to the exhaust chamber relief surface 66 of the exhaust chamber flange 62 by the second outer attachment bolt 76*b*. This spacer 90 has an outer frame contact surface 91 facing the axial upstream side Dau and in contact with the outer frame 84, a frame-side recessed portion 92 recessed from the outer frame contact surface 91 to the axial downstream side Dad, a pressing plate contact surface 93 facing the axial downstream side Dad and in contact with the second outer pressure plate 75*b*, and a pressing plate-side recessed portion 94 recessed from the pressing plate contact surface 93 to the axial upstream side Dau. A width in the axial direction Da between the outer frame contact surface 91 and the pressing plate contact surface 93 in the spacer 90 substantially coincides with a distance in the axial direction Da between the outer frame 84 of the third seal assembly 81 and the second outer pressing plate 75*b*. Therefore, the outer frame 84 of the third seal assembly 81 is sandwiched between the first outer pressing plate 75*a* and the spacer 90 positioned axially upstream of the second outer pressing plate 75*b*, and thereby movement in the axial direction Da is restricted. A bolt head 76*h* of the second outer attachment bolt 76*b*, which secures the second outer pressing plate 75*b* to the exhaust chamber relief surface 66 of the exhaust chamber flange 62, fits into the pressing plate-side recessed portion 94 of the spacer 90.

As described above, the second outer pressing plate 75*b* serving as a second member provided to be immovable relative to the exhaust chamber 60 is disposed in the frame-to-relief surface space S3. The spacer movement retainer 95 increases a frictional force between the second outer pressing plate 75*b* and the spacer 90, thereby suppressing movement of the spacer 90 in the radial direction Dr and the axial direction Da. The spacer movement retainer 95 includes a spring 96 generating an elastic force in the axial direction Da, a spring support frame 97 covering an end of the spring 96 on the axial upstream side Dau and in contact with the first outer pressing plate (first member) 75*a*, and a spring cover 98 covering an end of the spring 96 on the axial downstream end Dad and in contact with the spacer 90. The spring support frame 97 is in contact with the first outer pressing plate (first member) 75*a* from the axial downstream side Dad. A tip portion of the spring cover 98 fits into the frame-side recessed portion 92 of the spacer 90 to be in contact with a bottom surface of the frame-side recessed portion 92. Therefore, the spacer 90 is pressed to the axial downstream side Dad by the spring 96 through the spring cover 98 and increases a frictional force between itself and the second outer pressing plate (second member) 75*b*.

Next, a procedure for attaching the third annular seal device 80 described above will be described with reference to FIGS. 6 to 8.

Figure 6:
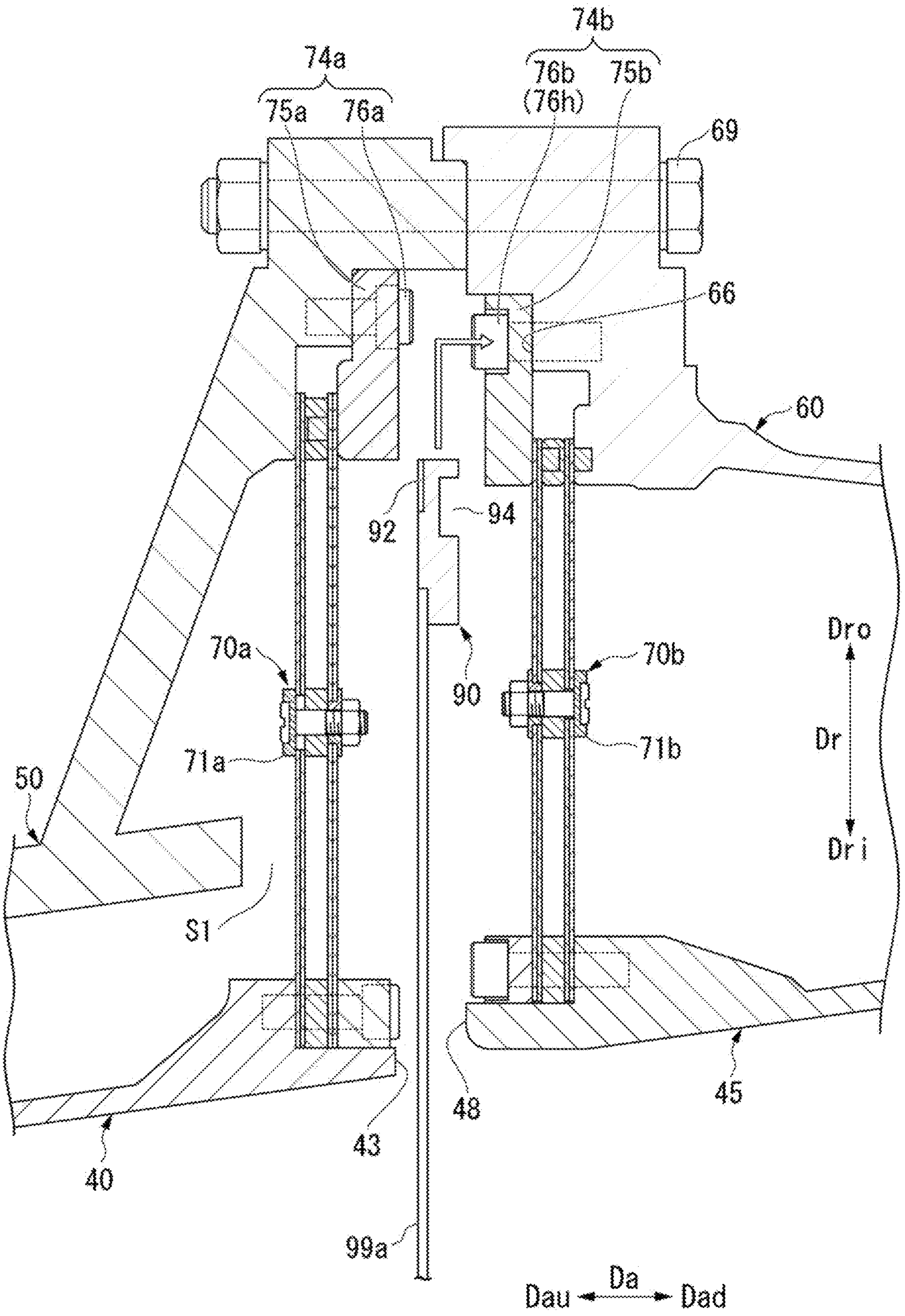
FIG. 6 is an explanatory view illustrating a process of disposing a spacer in one embodiment according to the present disclosure.

Before the third annular seal device 80 is attached, the exhaust casing flange 52 and the exhaust chamber flange 62 are connected by the flange connection bolt 69 as illustrated in FIG. 6. The first annular seal device 70*a* is provided from an end part of the first outer diffuser 40 on the axial downstream side Dad to an end part of the exhaust casing 50 on the axial downstream side Dad. The second annular seal device 70*b* is provided from an end part of the second outer diffuser 45 on the axial upstream side Dau to an end part of the exhaust chamber 60 on the axial upstream side Dau.

First, the spacer 90 is disposed between the first outer pressing plate 75*a* and the second outer pressing plate 75*b*. Further, the spacer 90 is disposed so that the bolt head 76*h* of the second outer attachment bolt 76*b*, which secures the second outer pressing plate 75*b* to the exhaust chamber relief surface 66 of the exhaust chamber flange 62, fit into the pressing plate-side recessed portion 94 of the spacer 90. In the process of disposing the spacer 90, a jig 99*a* is used to move the spacer 90 from the radial inner side Dri of the first outer diffuser 40 and the second outer diffuser 45 to a space between the first outer pressing plate 75*a* and the second outer pressing plate 75*b* through between the first outer diffuser end surface 43 and the second outer diffuser end surface 48.

Figure 7:
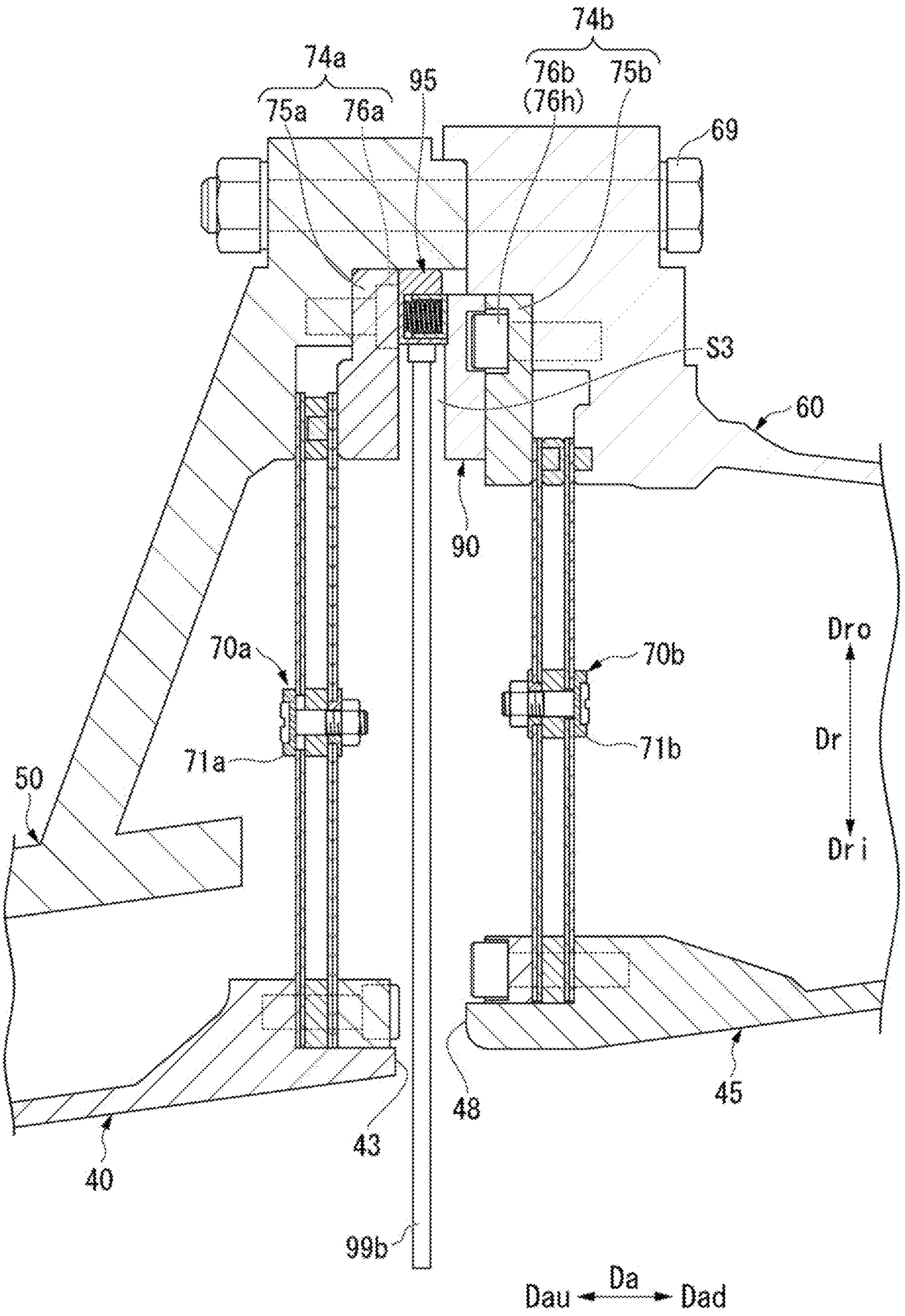
FIG. 7 is an explanatory view illustrating a process of disposing a spacer movement retainer in one embodiment according to the present disclosure.

If the bolt head 76*h* of the second outer attachment bolt 76*b* merely fits into the pressing plate-side recessed portion 94 of the spacer 90, there is a high possibility that the spacer 90 will fall off. Therefore, the spacer movement retainer 95 is disposed between the spacer 90 and the first outer pressing plate 75*a* as illustrated in FIG. 7. Further, as illustrated in FIG. 5, the spacer movement retainer 95 is disposed so that the spring support frame 97 of the spacer movement retainer 95 is in contact with the first outer pressing plate 75*a*, and the tip portion of the spring cover 98 of the spacer movement retainer 95 fits into the frame-side recessed portion 92 of the spacer 90 to be in contact with the bottom surface of the frame-side recessed portion 92. In the process of disposing the spacer movement retainer 95, the jig 99*b* is used to move the spacer movement retainer 95 from the radial inner side Dri of the first outer diffuser 40 and the second outer diffuser 45 to a space between the spacer 90 and the first outer pressing plate 75*a* through between the first outer diffuser end surface 43 and the second outer diffuser end surface 48.

Due to the disposition of the spacer movement retainer 95, a frictional force between the second outer pressing plate 75*b* and the spacer 90 increases, thereby suppressing the movement of the spacer 90 in the radial direction Dr and the axial direction Da.

Therefore, the spacer 90 can be prevented from falling off.

Incidentally, as a method for suppressing the movement of the spacer 90 in the radial direction Dr and the axial direction Da, there is a method of using a bolt that penetrates the spacer 90 in the axial direction Da. If this method is employed, when the exhaust casing contact surface 54 of the exhaust casing flange 52 and the exhaust chamber contact surface 64 of the exhaust chamber flange 62 are in contact with each other, the bolt cannot be moved in the axial direction Da in the frame-to-relief surface space S3. Therefore, when this method is employed, the exhaust chamber 60 needs to be separated from the exhaust casing 50. However, in the present embodiment, since the spacer movement retainer 95 increases a frictional force between the spacer 90 and the second outer pressing plate 75*b*, which serves as a member, to suppress movement of the spacer 90 in the radial direction Dr and the axial direction Da without using a bolt, the spacer 90 and the spacer movement retainer 95 can be disposed even in a state in which the exhaust chamber 60 is connected to the exhaust casing 50.

Figure 8:
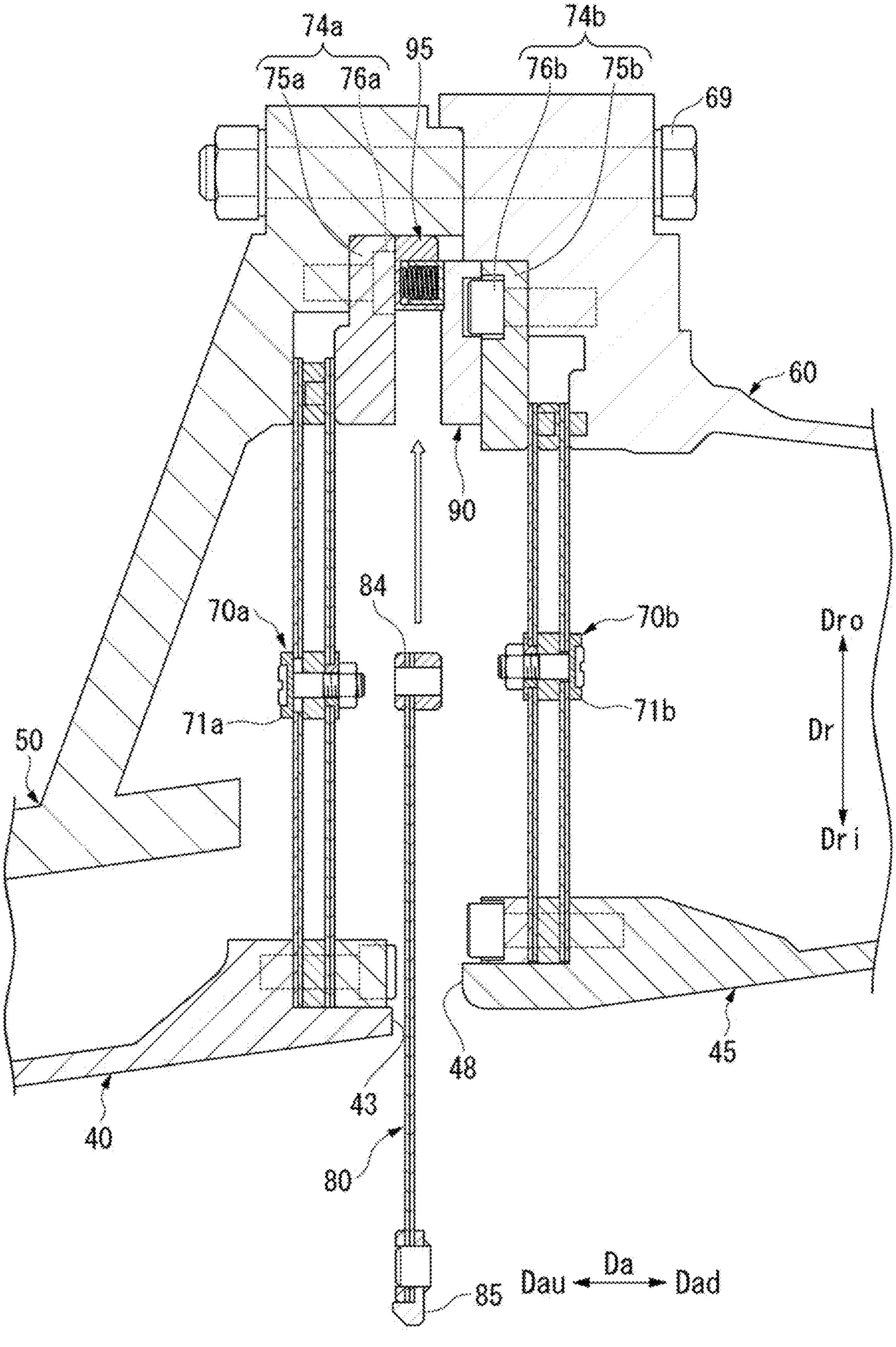
FIG. 8 is an explanatory view illustrating a process of disposing a third seal assembly in one embodiment according to the present disclosure.

Next, as illustrated in FIGS. 8 and 3, the third seal assembly 81 is disposed so that the outer frame 84 of the third seal assembly 81 is positioned between the first outer pressing plate 75*a* and the spacer 90, and the inner frame 85 of the third seal assembly 81 faces the first outer diffuser end surface 43. In the process of disposing the third seal assembly 81, the third seal assembly 81 is moved to the radial outer side Dro so that the outer frame 84 of the third seal assembly 81 reaches the space between the spacer 90 and the first outer pressing plate 75*a* through between the first outer diffuser end surface 43 and the second outer diffuser end surface 48 from the radial inner side Dri of the first outer diffuser 40 and the second outer diffuser 45.

Figure 9:
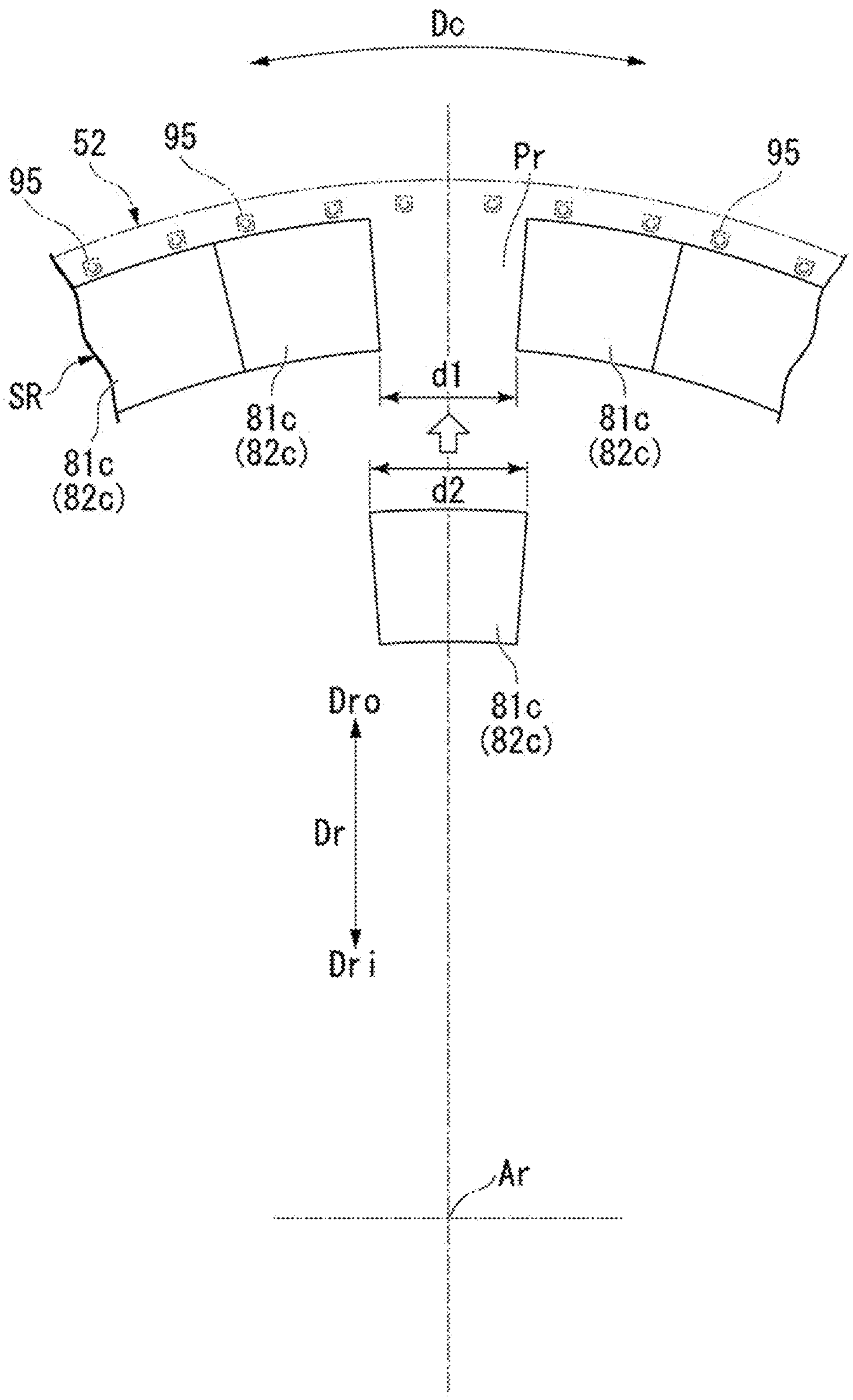
FIG. 9 is an explanatory view illustrating a disposition and a shape of a seal plate group of each of a plurality of third seal assemblies in a comparative example.

Incidentally, as illustrated in FIG. 9, when seal plate groups 82*c* of a plurality of third seal assemblies 81*c* are aligned in the circumferential direction Dc to form an annular seal plate group row SR with the axis Ar as a center, a length in the circumferential direction Dc of an outer edge of the annular seal plate group row SR is larger than a length in the circumferential direction De of an inner edge of the annular seal plate group row SR. Therefore, for all the seal plate groups 82*c* of each of the plurality of third seal assemblies 81*c*, a length in the circumferential direction Dc of an outer edge of the seal plate group 82*c* is made larger than a length in the circumferential direction Dc of an inner edge of the annular seal plate group 82*c*.

In this case, as described above, even if an attempts is made to sequentially dispose the plurality of third seal assemblies 81*c*, it is not possible to move the third seal assembly 81*c* to be disposed last to the radial outer side Dro and dispose the last third seal assembly 81*c* at an intended position. This is because, with a planned disposition position Pr, at which the last third seal assembly 81*c* is to be disposed, used as a reference among the plurality of third seal assemblies 81*c* already disposed, a distance d1 in the circumferential direction Dc between an inner edge of the seal plate group 82*c* of the third seal assembly 81*c* disposed on one side in the circumferential direction Dc and an inner edge of the seal plate group 82*c* of the third seal assembly 81*c* disposed on the other side in the circumferential direction Dc is smaller than a distance d2 in the circumferential direction Dc of an outer edge of the seal plate group 82*c* of the last third seal assembly 81*c*.

Therefore, in order to sequentially move the plurality of third seal assemblies 81 to the radial outer side Dro to dispose all the plurality of third seal assemblies 81 at intended positions, each seal plate 83 constituting the seal plate group 82 of at least some of the third seal assemblies 81 among the plurality of third seal assemblies 81 needs to have a length of the outer edge in the circumferential direction Dc that is the same as a length of the inner edge in the circumferential direction Dc. In this case, of the plurality of third seal assemblies 81, each seal plate 83 constituting the seal plate group 82 of the other third seal assemblies 81 excluding at least some of the third seal assemblies 81 has a length in the circumferential direction Dc of the outer edge that is larger than a length in the circumferential direction Dc of the inner edge.

Figure 10:
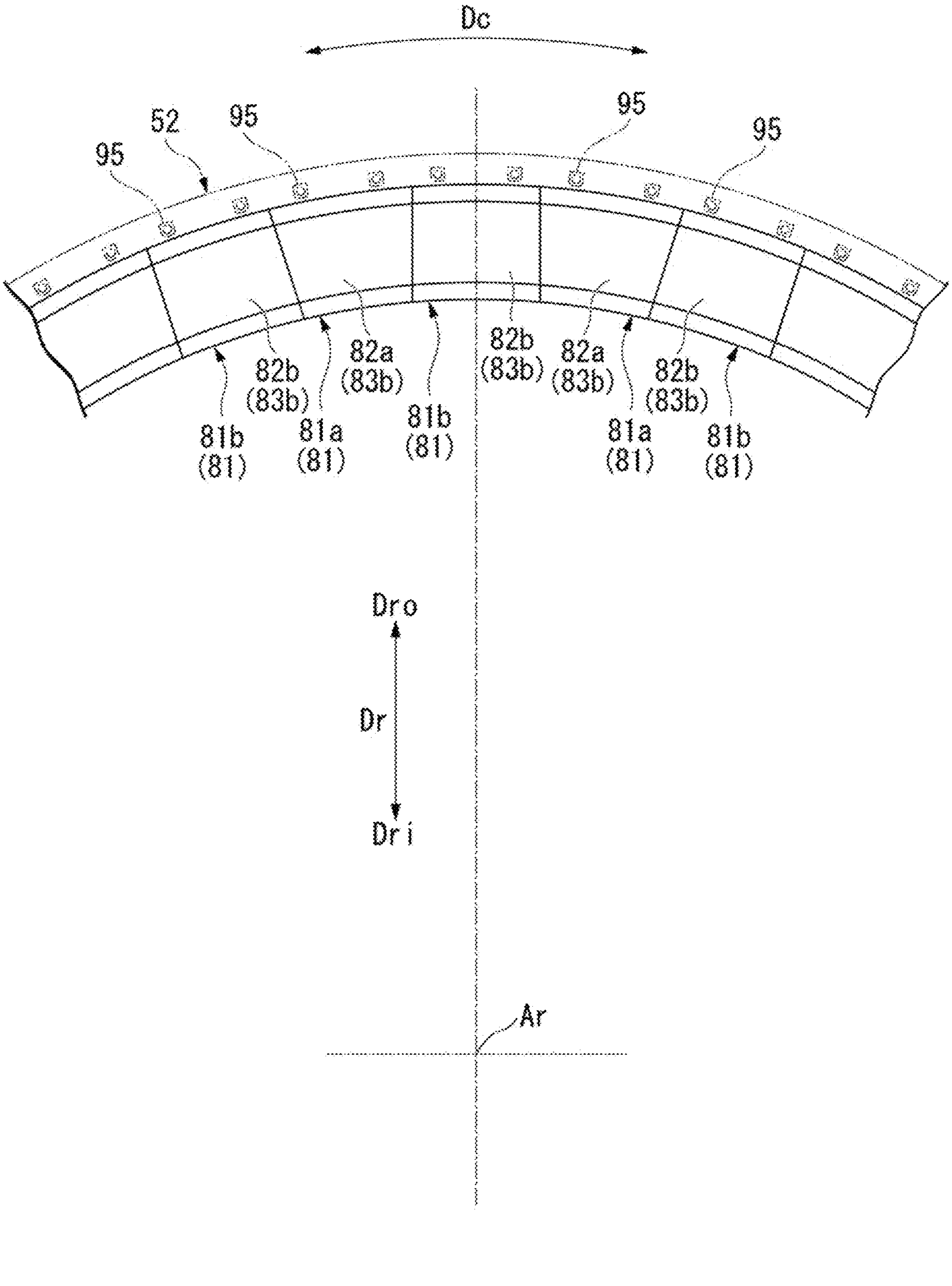
FIG. 10 is an explanatory view illustrating a disposition and a shape of a seal plate group of each of the plurality of third seal assemblies in one embodiment according to the present disclosure.

In the present embodiment, from the above, of the plurality of third seal assemblies 81, each seal plate 83*b* constituting a seal plate group 82*b* of some of a plurality of third seal assemblies 81*b* has a length in the circumferential direction Dc of the outer edge that is the same as a length in the circumferential direction De of the inner edge as illustrated in FIG. 10. Also, of the plurality of third seal assemblies 81, each seal plate 83*a* constituting a seal plate group 82*a* of a remaining plurality of third seal assemblies 81*a* has a length of the outer edge in the circumferential direction Dc that is larger than a length of the inner edge in the circumferential direction Dc. Therefore, in the present embodiment, it is possible to sequentially move all the third seal assemblies 81 to the radial outer side Dro and dispose all the third seal assemblies 81 at intended positions.

Once disposition of the third seal assembly 81 ends, as described above with reference to FIG. 4, the inner frame 85 of the third seal assembly 81 is joined to the first outer diffuser end surface 43 by welding.

As a method for restricting relative movement of the inner frame 85 of the third seal assembly 81 with respect to an end of the first outer diffuser 40, there is a method using a bolt that penetrates the inner frame 85 in the axial direction Da.

When this method is employed, the bolt cannot be moved in the axial direction Da when the exhaust casing contact surface 54 of the exhaust casing flange 52 and the exhaust chamber contact surface 64 of the exhaust chamber flange 62 are in contact with each other. Therefore, if this method is employed, the exhaust chamber 60 needs to be separated from the exhaust casing 50. However, in the present embodiment, since the inner frame 85 is fixed to the end of the first outer diffuser 40 by welding without using a bolt, the inner frame 85 can be fixed to the end of the first outer diffuser 40 even when the exhaust chamber 60 is connected to the exhaust casing 50.

As described above, attachment of the third annular seal device 80 is completed.

As described above, in the present embodiment, an inflow of the exhaust gas HG to the first outer space S1 can be suppressed by the first annular seal device 70*a*, and an inflow of the exhaust gas HG into the second outer space S2 can be suppressed by the second annular seal device 70*b*.

Further, in the present embodiment, a flow of the exhaust gas HG to a side of the first annular seal device 70*a* can be suppressed by the third annular seal device 80. That is, in the present embodiment, the inflow of the exhaust gas HG into the first outer space S1 can be suppressed by the two seal devices, the first annular seal 70*a* and the third annular seal device 80.

If it is assumed that a high-temperature exhaust gas HG has flowed into the first outer space S1, a cooling effect of the first outer diffuser 40 by an air present in the first outer space S1 is significantly reduced, and the first outer diffuser 40 may suffer thermal damage.

In the present embodiment, even if the third annular seal device 80 is assumed to suffer thermal damage by heat of the exhaust gas HG, the inflow of the exhaust gas HG into the first outer space S1 can be suppressed by the first annular seal device 70*a*. Therefore, in the present aspect, it is possible to suppress thermal damage to the first outer diffuser 40 caused by the inflow of the high-temperature exhaust gas HG into the first outer space S1.

As a plant including a gas turbine, there are plants that include a heat recovery boiler which generates steam by utilizing heat of the exhaust gas HG exhausted from the gas turbine. In this case, in the present embodiment, it is possible to suppress decrease in an amount of the exhaust gas HG supplied to the heat recovery boiler caused by leakage of the exhaust gas HG from the exhaust flow path HP.

Also, in the present embodiment, each component constituting the third annular seal device 80 can be moved from the radial inner side Dri of the first outer diffuser 40 and the second outer diffuser 45 to the radial outer side Dro through between the first outer diffuser end surface 43 and the second outer diffuser end surface 48 so that each component constituting the third annular seal device 80 can be disposed at an intended position. Therefore, in the present embodiment, even when the exhaust chamber 60 is connected to the exhaust casing 50, the third annular seal device 80 can be attached to an intended position, and the third annular seal device 80 can be removed from the intended position.

Modified Example of Spacer Movement Retainer

Figure 11:
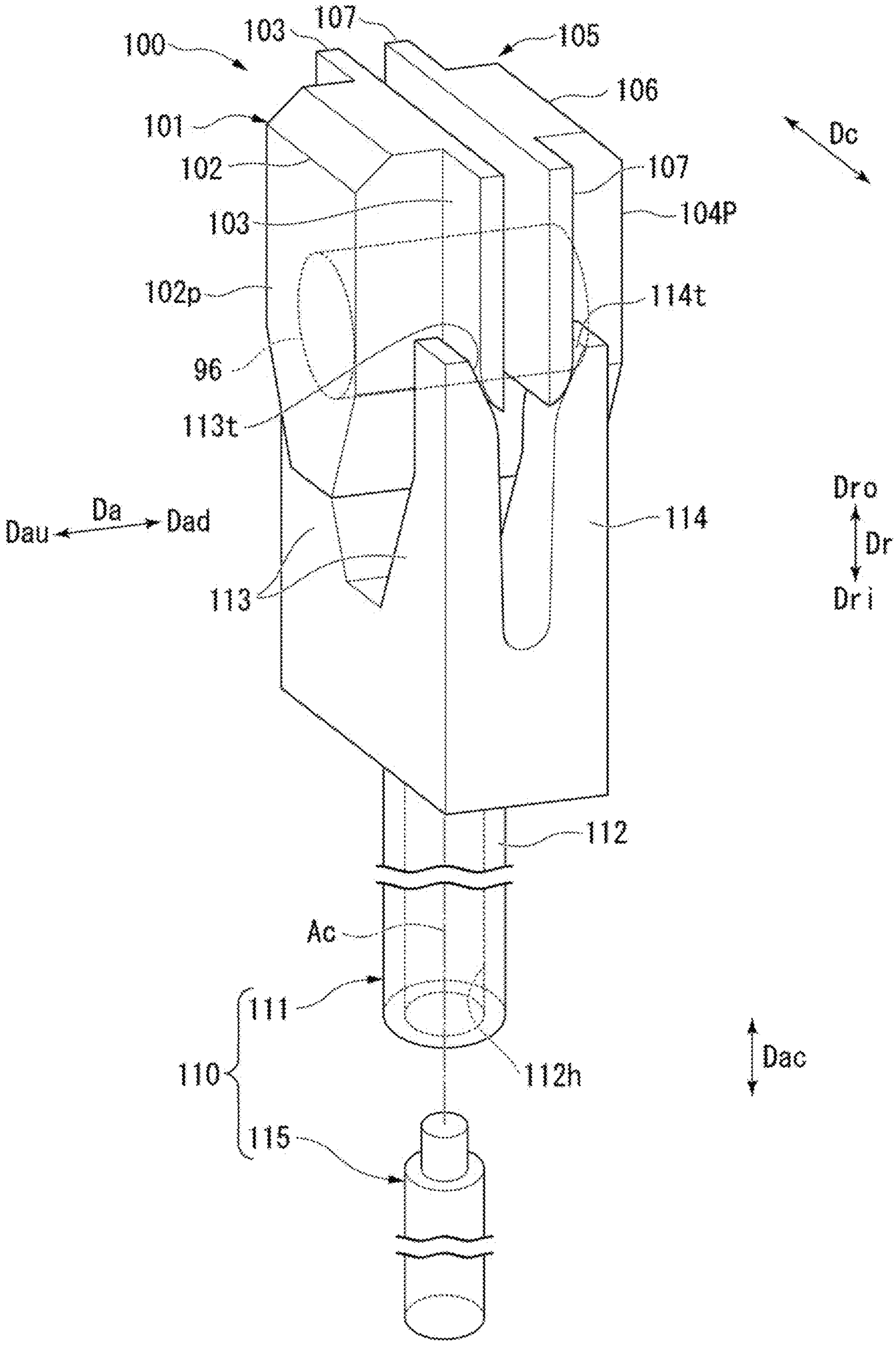
FIG. 11 is a perspective view of a spacer movement retainer and a jig in a modified example according to the present disclosure.
Figure 12:
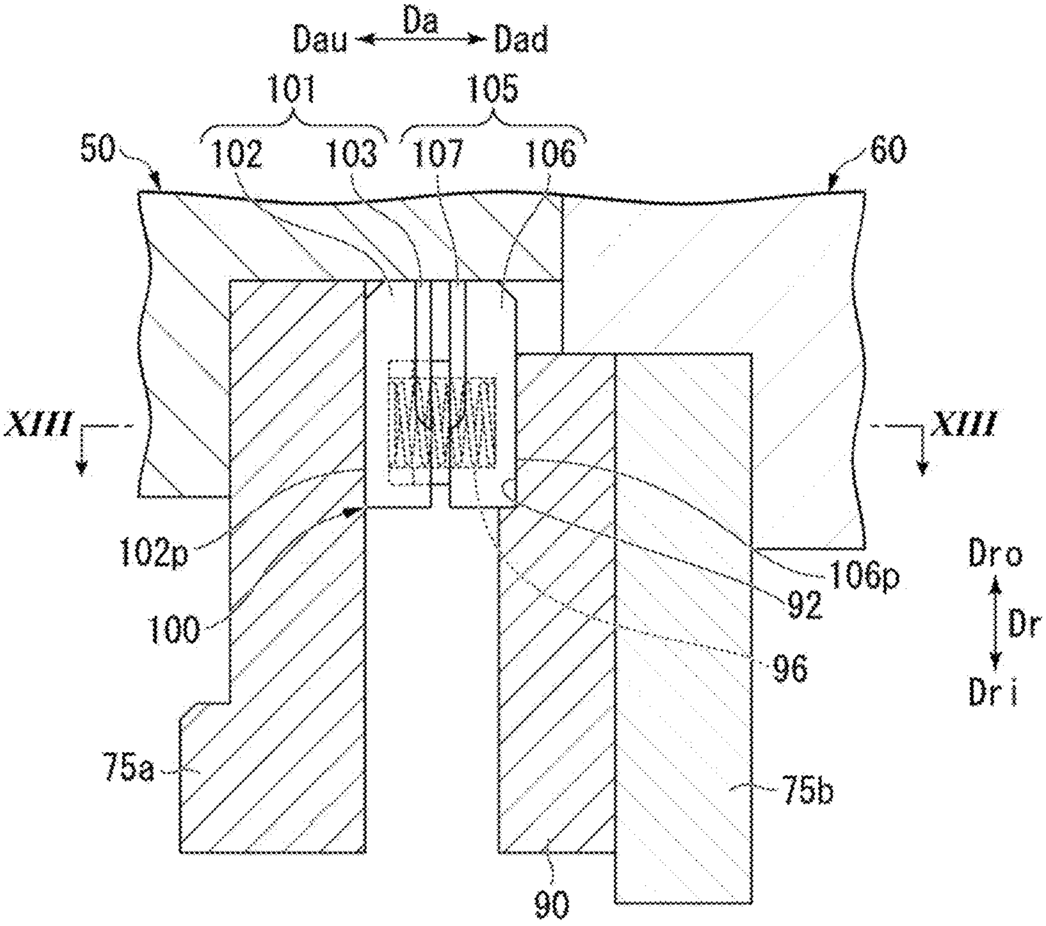
FIG. 12 is a side view of the spacer movement retainer in the modified example according to the present disclosure.
Figure 13:
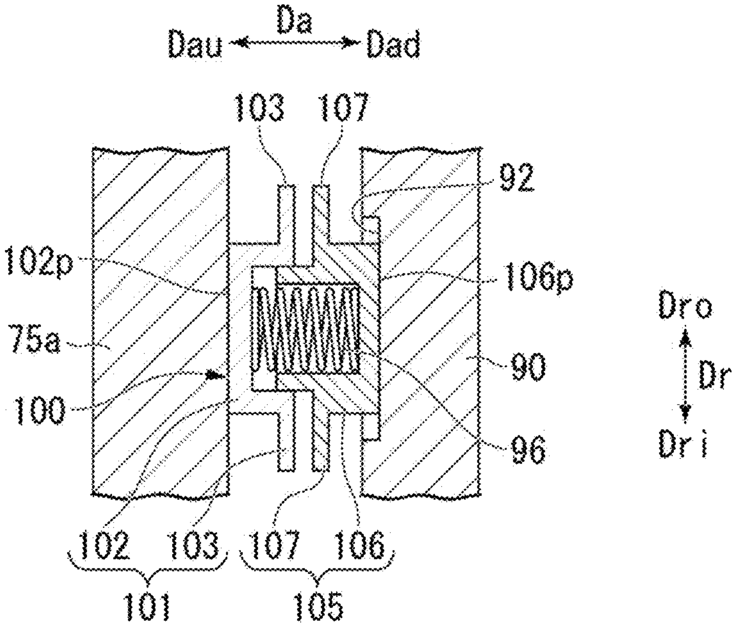
FIG. 13 is a cross-sectional view along line XIII-XIII in FIG. 12.

As illustrated in FIGS. 11 to 13, a spacer movement retainer 100 in the present modified example also has the spring 96, a spring support frame 101, and a spring cover 105 similarly to the spacer movement retainer 95 in the above embodiment.

The spring support frame 101 in the present modified example includes a frame main body 102 covering an end of the spring 96 on the axial upstream side Dau, and a frame flange 103. The frame main body 102 has a member contact surface 102*p* that comes into contact with the outer pressing plate 75*a* serving as the first member. The frame flange 103 is positioned on the axial downstream side Dad with respect to the member contact surface 102*p*, and protrudes in the circumferential direction Dc from the frame main body 102.

The spring cover 105 includes a cover main body 106 that covers an end of the spring 96 on the axial downstream side Dad, and a cover flange 107. The cover main body 106 has a spacer contact surface 106*p* that is in contact with the spacer 90. The cover flange 107 is positioned on the axial upstream side Dau with respect to the spacer contact surface 106*p*, and protrudes in the circumferential direction Dc from the cover main body 106. The cover flange 107 faces the frame flange 103 with a gap therebetween in the axial direction Da.

A jig 110 is used when the spacer movement retainer 100 of the present modified example is disposed between the spacer 90 and the first outer pressing plate 75*a*. The jig 110 includes a clamping jig 111 and a pressing rod 115.

The clamping jig 111 includes a finger support rod 112, and a first finger 113 and a second finger 114 provided at a tip of the finger support rod 112. The finger support rod 112 has a hole 112*h* formed in a central axis direction Dac in which a central axis Ac of the finger support rod 112 extends, and through which the finger support rod 112 is penetrated at a position of the central axis Ac. The first finger 113 and the second finger 114 both extend in the central axis direction Dac. The first finger 113 and the second finger 114 face each other with a gap therebetween in a radial direction with respect to the central axis Ac. A first tapered surface 113*t* is formed at a tip portion of the first finger 113. The first tapered surface 113*t* is inclined with respect to the central axis direction Dac such that it gradually becomes farther from the second finger 114 toward a side away from the finger support rod 112 in the central axis direction Dac. A second tapered surface 114*t* is formed at a tip portion of the second finger 114. This second tapered surface 114*t* is inclined with respect to the central axis direction Dac such that it gradually becomes farther from the first finger 113 toward a side away from the finger support rod 112 in the central axis direction Dac.

The pressing rod 115 is a rod that can be inserted through the hole 112*h* formed in the finger support rod 112 of the clamping jig 111.

Figure 14:
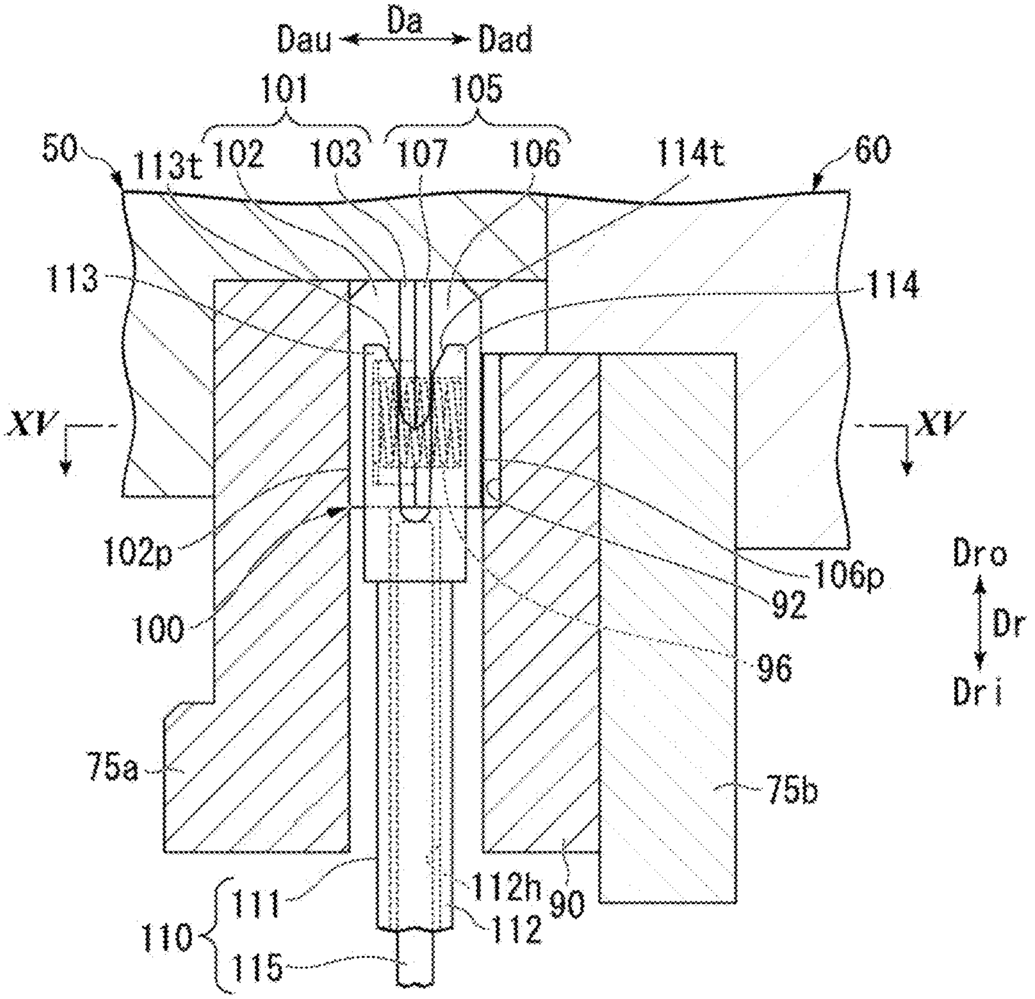
FIG. 14 is an explanatory view illustrating an attachment procedure (part 1) and a removal procedure of the spacer movement retainer in the modified example according to the present disclosure.
Figure 15:
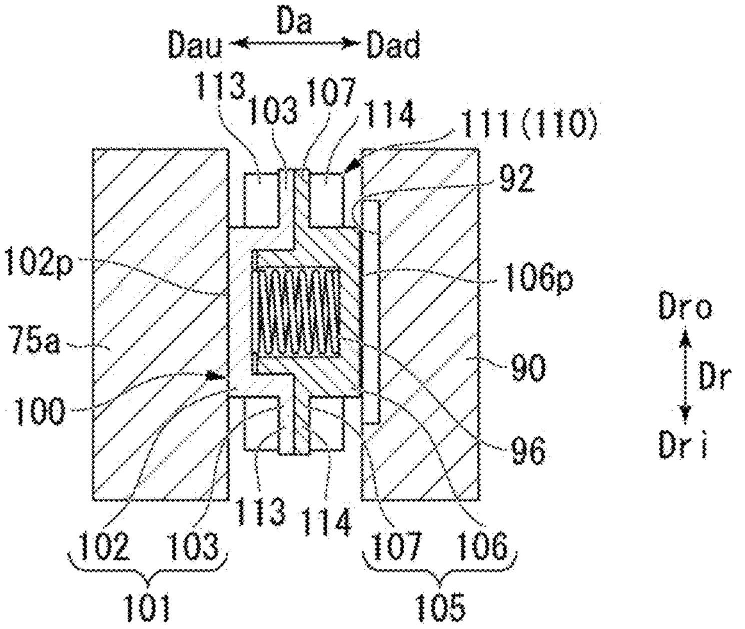
FIG. 15 is a cross-sectional view along line XV-XV in FIG. 14.

Next, a procedure for attaching the spacer movement retainer 100 using the above-described jig 110 will be described with reference to FIGS. 14 and 15. First, the spring 96 is disposed between the spring support frame 101 and the spring cover 105, and the spring 96 is covered with the spring support frame 101 and the spring cover 105. Next, the frame flange 103 of the spring support frame 101 and the cover flange 107 of the spring cover 105 are inserted between the first finger 113 and the second finger 114 of the clamping jig 111 to reduce a gap between the frame flange 103 and the cover flange 107. As a result, a gap between the member contact surface 102*p* of the spring support frame 101 and the spacer contact surface 106*p* of the spring cover 105 is reduced. Then, the clamping jig 111 is operated so that the spacer movement retainer 100 attached to the clamping jig 111 is inserted between the spacer 90 and the first outer pressing plate 75*a*.

Figure 16:
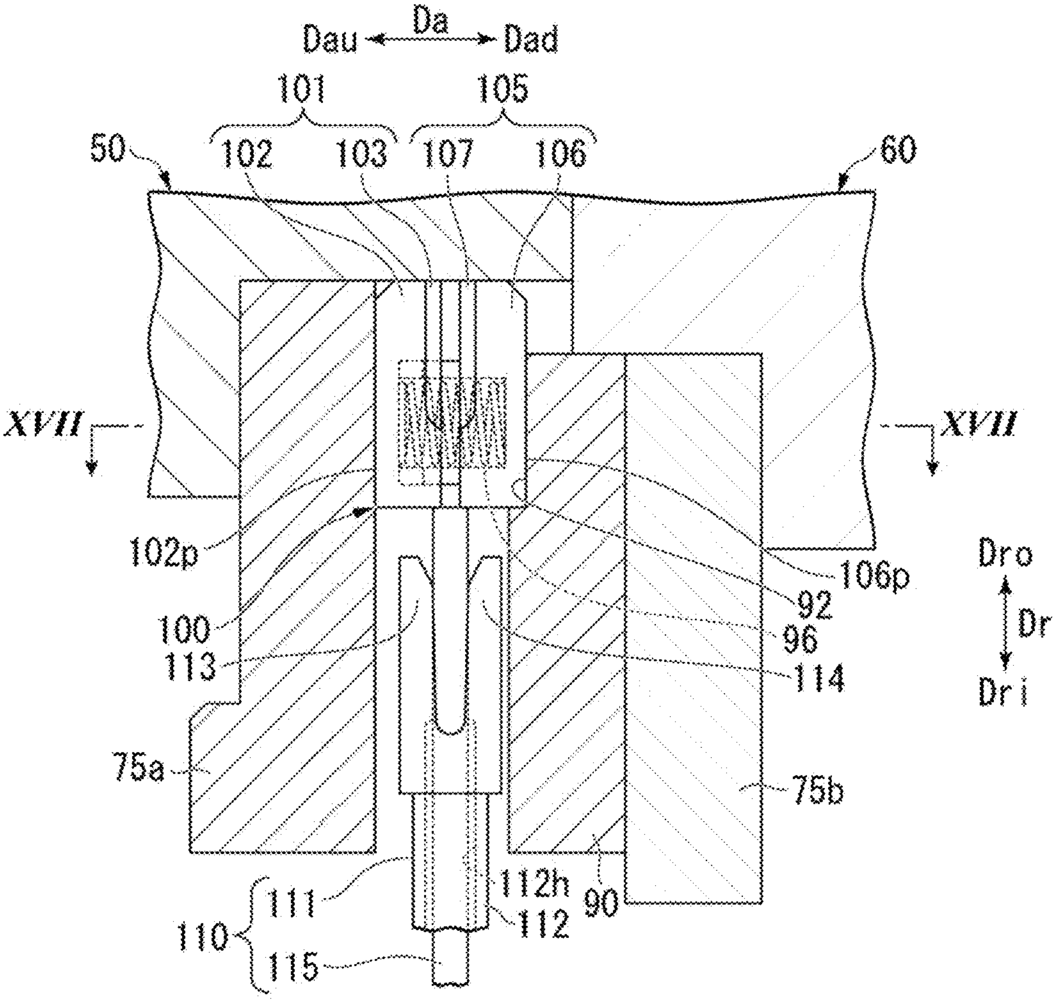
FIG. 16 is an explanatory view illustrating an attachment procedure (part 2) of the spacer movement retainer in the modified example according to the present disclosure.
Figure 17:
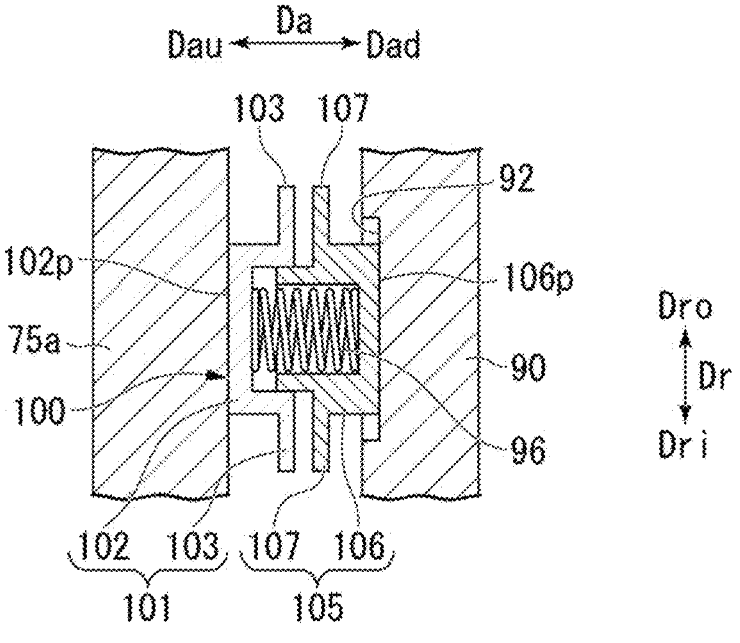
FIG. 17 is a cross-sectional view along line XVII-XVII in FIG. 16.

After the spacer movement retainer 100 is inserted between the spacer 90 and the first outer pressing plate 75*a*, as illustrated in FIGS. 16 and 17, the pressing rod 115 is made to protrude to the radial outer side Dro from the hole 112*h* of the finger support rod 112, while the clamping jig 111 is pulled to the radial inner side Dri.

As a result, the spacer movement retainer 100 is supported by the pressing rod 115, and the frame flange 103 and the cover flange 107 are removed from between the first finger 113 and the second finger 114 of the clamping jig 111 while a position of the spacer movement retainer 100 in the radial direction Dr is not changed. Then, a distance between the frame flange 103 and the cover flange 107 and a distance between the member contact surface 102*p* of the spring support frame 101 and the spacer contact surface 106*p* of the spring cover 105 increase due to the spring 96 of the spacer movement retainer 100. Then, the member contact surface 102*p* of the spring support frame 101 comes into close contact with the outer pressing plate 75*a*, and the spacer contact surface 106*p* of the spring cover 105 comes into close contact with the spacer 90.

As described above, attachment of the spacer movement retainer 100 is completed.

Next, a procedure for removing the spacer movement retainer 100 using the above-described jig 110 will be described with reference to FIGS. 14 and 15 again. The clamping jig 111 is attached to the spacer movement retainer 100 positioned between the spacer 90 and the first outer pressing plate 75*a*. At this time, the clamping jig 111 is operated to move to the radial outer side Dro so that the first finger 113 and the second finger 114 of the clamping jig 111 reach between the spacer 90 and the first outer pressing plate 75*a*. In the process of this operation, the frame flange 103 comes into contact with the first tapered surface 113*t* of the first finger 113, and the cover flange 107 comes into contact with the second tapered surface 114*t* of the second finger 114. When the clamping jig 111 is operated to move further to the radial outer side Dro, the frame flange 103, which is in contact with the first tapered surface 113*t* of the first finger 113, is pushed by the first tapered surface 113*t* and gradually moves to a side of the cover flange 107 (the axial downstream side Dad). Further, the cover flange 107 in contact with the second tapered surface 114*t* of the second finger 114 is pushed by the second tapered surface 114*t* and gradually moves to a side of the spring support frame 101 (the axial upstream side Dau). That is, the distance between the frame flange 103 and the cover flange 107 and the distance between the member contact surface 102*p* of the spring support frame 101 and the spacer contact surface 106*p* of the spring cover 105 reduce gradually.

When the frame flange 103 of the spring support frame 101 and the cover flange 107 of the spring cover 105 are completely inserted between the first finger 113 and the second finger 114 of the clamping jig 111, the spacer contact surface 106*p* of the cover flange 107 is completely separated from the spacer 90. Then, the spacer movement retainer 100 attached to the clamping jig 111 is pulled from between the spacer 90 and the first outer pressing plate 75*a* to the radial inner side Dri by operating the finger support rod 112.

As described above, removal of the spacer movement retainer 100 is completed.

As described above, when the spacer movement retainer 100 and the jig 110 of the present modified example are used, disposition and removal of the spacer movement retainer 100 can be easily performed.

Other Modified Examples

In the above embodiment, after the spacer 90 is disposed between the first outer pressing plate 75*a* and the second outer pressing plate 75*b*, the spacer movement retainers 95 and 100 are used to suppress movement of the spacer 90 until the outer frame 84 of the third seal assembly 81 is positioned between the spacer 90 and the first outer pressing plate 75*a*, and the inner frame 85 of the third seal assembly 81 is welded to the first outer diffuser end portion 42. However, if careful work is performed so that the spacer 90 does not move during that time, or if the spacer 90 is held in place with a jig during that time, the spacer movement retainer 95 may not be necessary.

Also, in the above embodiment, the third annular seal device 80 is provided at an end of the first outer diffuser 40 on the axial downstream side Dad to suppress a flow of the exhaust gas HG to a side of the first annular seal device 70*a*. However, the third annular seal device 80 may be provided at an end of the second outer diffuser 45 on the axial upstream side Dau to suppress a flow of the exhaust gas HG to a side of the second annular seal device 70*b*. In this case, the inflow of the exhaust gas HG into the second outer space S2 can be suppressed by the two seal devices, the second annular seal device 70*b* and the third annular seal device 80. Therefore, in this case, it is possible to suppress thermal damage to the second outer diffuser 45 caused by the inflow of the high-temperature exhaust gas HG into the second outer space S2.

Also, the present disclosure is not limited to one embodiment and modified examples described above. Various additions, modifications, substitutions, partial deletions, and the like can be made within a range not departing from the conceptual idea and spirit of the present invention derived from the contents defined in the claims and their equivalents.

Additional Statements

The exhaust systems in the above embodiment and modified examples can be understood, for example, as follows.

(1) An exhaust system of a first aspect includes a first outer diffuser 40 having a cylindrical shape centered on an axis Ar and defining an edge on a radial outer side Dro of an upstream portion of an exhaust flow path HP through which an exhaust gas HG that has rotated a turbine rotor 21 passes, a second outer diffuser 45 disposed on an axial downstream side Dad, between an axial upstream side Dau and the axial downstream side Dad, of the first outer diffuser 40 with a gap therebetween in an axial direction Da in which the axis Ar extends, having a cylindrical shape centered on the axis Ar, and defining an edge on the radial outer side Dro of a downstream portion of the exhaust flow path HP through which the exhaust gas HG having passed through the inside of the first outer diffuser 40 passes, an exhaust casing 50 having a cylindrical shape centered on the axis Ar and covering an outer circumferential side of the first outer diffuser 40, an exhaust chamber 60 having a cylindrical shape centered on the axis Ar and covering an outer side of the second outer diffuser 45, a first annular seal device 70*a* having an annular shape centered on the axis Ar, a second annular seal device 70*b* having an annular shape centered on the axis Ar, and a third annular seal device 80 having an annular shape centered on the axis Ar. The exhaust casing 50 includes an exhaust casing main body 51 having a cylindrical shape centered on the axis Ar, and an exhaust casing flange 52 extending from an end of the exhaust casing main body 51 on the axial downstream side Dad to the radial outer side Dro with respect to the axis Ar. The exhaust chamber 60 includes an exhaust chamber main body 61 having a cylindrical shape centered on the axis Ar, and an exhaust chamber flange 62 extending from an end of the exhaust chamber main body 61 on the axial upstream side Dau to the radial outer side Dro to be connected to the exhaust casing flange 52. The first annular seal device 70*a* is provided in the first outer diffuser 40 to suppress an inflow of the exhaust gas HG into a first outer space S1 between the first outer diffuser 40 and the exhaust casing main body 51. The second annular seal device 70*b* is provided in the second outer diffuser 45 to suppress an inflow of the exhaust gas HG into a second outer space S2 between the second outer diffuser 45 and the exhaust chamber main body 61. The third annular seal device 80 is disposed between the first annular seal device 70*a* and the second annular seal device 70*b* in the axial direction Da. The third annular seal device 80 is provided at an end of the first outer diffuser 40 on the axial downstream side Dad to suppress a flow of the exhaust gas HG to a side of the first annular seal device 70*a*, or is provided at an end of the second outer diffuser 45 on the axial upstream side Dau to suppress a flow of the exhaust gas HG to a side of the second annular seal device 70*b*.

In the present aspect, an inflow of the exhaust gas HG into the first outer space S1 can be suppressed by the first annular seal device 70*a*, and an inflow of the exhaust gas HG into the second outer space S2 can be suppressed by the second annular seal device 70*b*.

Further, in the present aspect, a flow of the exhaust gas HG to a side of the first annular seal device 70*a* or a flow of the exhaust gas HG to a side of the second annular seal device 70*b* can be suppressed by the third annular seal device 80. That is, in the present aspect, the inflow of the exhaust gas HG into the first outer space S1 can be suppressed by the two seal devices, the first annular seal device 70*a* and the third annular seal device 80, or the inflow of the exhaust gas HG into the second outer space S2 can be suppressed by the two seal devices, the second annular seal device 70*b* and the third annular seal device 80.

If it is assumed that a high-temperature exhaust gas HG has flowed into the first outer space S1, a cooling effect of the first outer diffuser 40 by an air present in the first outer space S1 is significantly reduced, and the first outer diffuser 40 may suffer thermal damage.

In the present aspect, even if the third annular seal device 80 is assumed to suffer thermal damage by heat of the exhaust gas HG, the inflow of the exhaust gas HG into the first outer space S1 can be suppressed by the first annular seal device 70*a*. Therefore, in the present aspect, it is possible to suppress thermal damage to the first outer diffuser 40 caused by the inflow of the high-temperature exhaust gas HG into the first outer space S1. Alternatively, in the present aspect, for similar reasons, it is possible to suppress thermal damage to the second outer diffuser 45 caused by the inflow of the high-temperature exhaust gas HG into the second outer space S2.

As a plant including a gas turbine, there are plants that include a heat recovery boiler which generates steam by utilizing heat of the exhaust gas HG exhausted from the gas turbine. In this case, in the present aspect, it is possible to suppress decrease in an amount of the exhaust gas HG supplied to the heat recovery boiler caused by leakage of the exhaust gas HG from the exhaust flow path HP.

(2) According to an exhaust system of a second aspect, in the exhaust system 30 of the first aspect, the third annular seal device 80 includes a plurality of third seal assemblies 81 aligned in a circumferential direction Dc with respect to the axis Ar. The plurality of third seal assemblies 81 each include a seal plate 83 extending in a radial direction Dr with respect to the axis Ar and the circumferential direction Dc, an inner frame 85 supporting an edge of the seal plate 83 on a radial inner side Dri with respect to the axis Ar, and an outer frame 84 supporting an edge of the seal plate 83 on the radial outer side Dro.

(3) According to an exhaust system of a third aspect, in the exhaust system 30 of the second aspect, the third annular seal device 80 is provided at an end of the second outer diffuser 45 on the axial upstream side Dau to suppress a flow of the exhaust gas HG to a side of the second annular seal device 70*b*. The exhaust casing flange 52 includes a connection portion 53 having an exhaust casing contact surface 54 in contact with the exhaust casing flange 62, and a relief portion 55 having an exhaust casing relief surface 56 positioned on the radial inner side Dri and the axial upstream side Dau with respect to the exhaust casing contact surface 54. The exhaust chamber flange 62 includes a connection portion 63 having an exhaust chamber contact surface 64 in contact with the exhaust casing contact surface 54, and a relief portion 65 having an exhaust chamber relief surface 66 which is positioned on the radial inner side Dri and the axial downstream side Dad with respect to the exhaust chamber contact surface 64 and faces the exhaust casing relief surface 56 with a gap therebetween in the axial direction Da. The outer frame 84 of each of the plurality of third seal assemblies 81 is disposed between the exhaust casing relief surface 56 and the exhaust chamber relief surface 66 to be movable in the radial direction Dr.

In the present aspect, thermal expansion of the third seal assembly 81 in the radial direction Dr can be allowed.

(4) According to an exhaust system of a fourth aspect, in the exhaust system 30 of the third aspect, the third annular seal device 80 includes a spacer 90 disposed in a frame-to-relief surface space S3 between the outer frame 84 of each of the plurality of third seal assemblies 81 and the exhaust chamber relief surface 66 and restricting movement of the outer frame 84 of each of the plurality of third seal assemblies 81 in the axial direction Da while allowing movement of the outer frame 84 in the radial direction Dr.

In the present aspect, movement of the outer frame 84 in the axial direction Da can be restricted while allowing movement of the outer frame 84 in the radial direction Dr.

(5) According to an exhaust system of a fifth aspect, in the exhaust system 30 of the fourth aspect, the second annular seal device 70*b* includes a second member 75*b* disposed in the frame-to-relief surface space S3 and provided to be immovable relative to the exhaust chamber 60. The third annular seal device 80 includes spacer movement retainers 95 and 100 increasing a frictional force between the spacer 90 and the second member 75*b* to suppress movement of the spacer 90 in the radial direction Dr and the axial direction Da.

In the present aspect, since movement of the spacer 90 in the radial direction Dr and the axial direction Da can be suppressed by the spacer movement retainers 95 and 100, movement of the spacer 90 from the frame-to-relief surface space S3 can be suppressed.

Incidentally, as a method for suppressing the movement of the spacer 90 in the radial direction Dr and the axial direction Da, there is a method of using a bolt that penetrates the spacer 90 in the axial direction Da. If this method is employed, when the exhaust casing contact surface 54 of the exhaust casing flange 52 and the exhaust chamber contact surface 64 of the exhaust chamber flange 62 are in contact with each other, the bolt cannot be moved in the axial direction Da in the frame-to-relief surface space S3. Therefore, if this method is employed, the exhaust chamber 60 needs to be separated from the exhaust casing 50. However, in the present aspect, since the spacer movement retainers 95 and 100 each increase a frictional force between the spacer 90 and the member to suppress movement of the spacer 90 in the radial direction Dr and the axial direction Da without using a bolt, the spacer 90 and the spacer movement retainers 95 and 100 can be disposed even in a state in which the exhaust chamber 60 is connected to the exhaust casing 50.

(6) According to an exhaust system of a sixth aspect, in the exhaust system 30 of the fifth aspect, the first annular seal device 70*a* includes a first member 75*a* facing the spacer 90 with a gap therebetween in the axial direction Da and provided to be immovable relative to the exhaust casing 50. The spacer movement retainers 95 and 100 each include a spring 96 generating an elastic force in the axial direction Da, spring support frames 97 and 101 each covering an end of the spring 96 on one side Dau in the axial direction Da and in contact with the first member 75*a*, and spring covers 98 and 105 each covering an end of the spring 96 on the other side Dad in the axial direction Da and in contact with the spacer 90.

(7) According to an exhaust system of a seventh aspect, in the exhaust system 30 in the sixth aspect, the spring support frame 101 includes a frame main body 102 covering an end of the spring 96 on the one side Dau in the axial direction Da, and a frame flange 103. The frame main body 102 has a member contact surface 102*p* that is in contact with the first member 75*a*. The frame flange 103 is positioned on the other side Dad in the axial direction Da with respect to the member contact surface 102*p* and protrudes in the circumferential direction Dc from the frame main body 102. The spring cover 105 includes a cover main body 106 covering an end of the spring 96 on the other side Dad in the axial direction Da, and a cover flange 107. The cover main body 106 has a spacer contact surface 106*p* that is in contact with the spacer 90. The cover flange 107 is positioned on the one side Dau in the axial direction Da with respect to the spacer contact surface 106*p*, and protrudes in the circumferential direction Dc from the cover main body 106. The cover flange 107 faces the frame flange 103 with a gap therebetween in the axial direction Da.

In the present aspect, when a gap between the frame flange 103 and the cover flange 107 is reduced and a gap between the member contact surface 102*p* of the spring support frame 101 and the spacer contact surface 106*p* of the spring cover 105 is reduced by using the jig 110, attachment and removal of the spacer movement retainer 100 can be easily performed.

(8) According to an exhaust system of an eighth aspect, in the exhaust system 30 of the sixth or seventh aspect, a recessed portion 92 recessed in the axial direction Da and into which some of the spring cover 98 or 105 fits is formed in the spacer 90.

In the present aspect, when some of the spring cover 98 or 105 of the spacer movement retainer 95 or 100 fits into the recessed portion 92 of the spacer 90, relative movement of the spacer 90 with respect to the spacer movement retainer 95 or 100 in the radial direction Dr and the circumferential direction Dc can be suppressed.

(9) According to an exhaust system of a ninth aspect, in the exhaust system 30 of any one of the third to eighth aspects, the inner frame 85 of each of the plurality of third seal assemblies 81 is fixed to an end of the first outer diffuser 40 on the axial downstream side Dad by welding.

As a method for restricting relative movement of the inner frame 85 of the third seal assembly 81 with respect to an end of the first outer diffuser 40, there is a method using a bolt that penetrates the inner frame 85 in the axial direction Da.

When this method is employed, the bolt cannot be moved in the axial direction Da when the exhaust casing contact surface 54 of the exhaust casing flange 52 and the exhaust chamber contact surface 64 of the exhaust chamber flange 62 are in contact with each other. Therefore, if this method is employed, the exhaust chamber 60 needs to be separated from the exhaust casing 50. However, in the present aspect, since the inner frame 85 is fixed to the end of the first outer diffuser 40 by welding without using a bolt, the inner frame 85 can be fixed to the end of the first outer diffuser 40 even when the exhaust chamber 60 is connected to the exhaust casing 50.

(10) According to an exhaust system of a tenth aspect, in the exhaust system 30 of any one of the second to ninth aspect, the seal plate 83*b* of at least one third seal assembly 81 of the plurality of third seal assemblies 81 has a length in the circumferential direction Dc of an edge on the radial outer side Dro that is the same as a length in the circumferential direction Dc of an edge on the radial inner side Dri. The seal plates 83*a* of the other third seal assemblies 81 of the plurality of third seal assemblies 81 excluding the at least one third seal assembly 81 have a length in the circumferential direction Dc of an edge on the radial outer side Dro that is larger than a length in the circumferential direction Dc of an edge on the radial inner side Dri.

In the present aspect, even when the exhaust chamber 60 is connected to the exhaust casing 50, it is possible to move all the third seal assemblies 81 from the radial inner side Dri of the first outer diffuser 40 and the second outer diffuser 45 to the radial outer side Dro and dispose all the third seal assemblies 81 at intended positions.

The gas turbines in the above embodiment and modified examples can be understood, for example, as follows.

(11) A gas turbine of an eleventh aspect includes an exhaust system 30 according to any one of the first to tenth aspects, a compressor 10 capable of compressing air to generate a compressed air, a combustor 2 capable of burning fuel in the compressed air to generate a combustion gas, and a turbine 20 capable of being driven by the combustion gas from the combustor 2. The turbine 20 includes a turbine rotor 21 that is rotatable around the axis Ar, and a turbine casing 25 that covers an outer circumference of the turbine rotor 21. The turbine rotor 21 includes a rotor shaft 22 extending in the axial direction Da with the axis Ar as a center, and a plurality of turbine blade rows 23 aligned in the axial direction Da at intervals in the axial direction Da and attached to the rotor shaft 22. The turbine casing 25 covers an outer circumference of a portion of the turbine rotor 21 in which the plurality of turbine blade rows 23 are present. The exhaust casing 50 of the exhaust system 30 is connected to an end of the turbine casing 25 on the axial downstream side Dad.

EXPLANATION OF REFERENCES

1 Gas turbine rotor
2 Combustor
6 Intermediate casing
10 Compressor
11 Compressor rotor
12 Rotor shaft
13 Compressor blade row
14 Compressor vane row
15 Compressor casing
20 Turbine
21 Turbine rotor
22 Rotor shaft
23 Turbine blade row
24 Turbine vane row
25 Turbine casing
26 Bearing
27 Bearing box
28 Strut
29 Strut cover

30 Exhaust system
31 First inner diffuser
32 Second inner diffuser
33 Seal device
40 First outer diffuser
41 First outer diffuser main body
42 First outer diffuser end portion
43 First outer diffuser end surface
44 Seal receiving surface
45 Second outer diffuser
46 Second outer diffuser main body
47 Second outer diffuser end portion
48 Second outer diffuser end surface
49 Seal receiving surface
50 Exhaust casing
51 Exhaust casing main body
52 Exhaust casing flange
53 Connection portion
54 Exhaust casing contact surface
55 Relief portion
56 Exhaust casing relief surface
56*a* First exhaust casing relief surface
56*b* Second exhaust casing relief surface
60 Exhaust chamber
61 Exhaust chamber main body
62 Exhaust chamber flange
63 Connection portion
64 Exhaust chamber contact surface
65 Relief portion
66 Exhaust chamber relief surface
66*a* First exhaust chamber relief surface
66*b* Second exhaust chamber relief surface
69 Flange connection bolt
70*a* First annular seal device
71*a* First seal assembly
72*ad* Downstream seal plate group
72*au* Upstream seal plate group
73*a* Spacer
74*a* First outer attachment fitting
75*a* First outer pressing plate (or, first member)
76*a* First outer attachment bolt
77*a* First inner attachment fitting
78*a* First inner pressing plate
79*a* First inner attachment bolt
70*b* Second annular seal device
71*b* Second seal assembly
72*bd* Downstream seal plate group
72*bu* Upstream seal plate group
73*b* Spacer
74*b* Second outer attachment fitting
75*b* Second outer pressing plate (or, second member)
76*b* Second outer attachment bolt
76*h* Bolt head
77*b* Second inner attachment fitting
78*b* Second inner pressing plate
79*b* Second inner attachment bolt
80 Third annular seal device
81, 81*c* Third seal assembly
82, 82*a*, 82*b*, 82*c* Seal plate group
83, 83*a*, 83*b* Seal plate
84 Outer frame
85 Inner frame
86 Outer pin
87 Inner pin
89 Welded portion
90 Spacer
91 Outer frame contact surface
92 Frame-side recessed portion
93 Pressing plate contact surface
94 Pressing plate-side recessed portion
95, 100 Spacer movement retainer
96 Spring
97, 101 Spring support frame
102 Frame main body
102*p* Member contact surface
103 Frame flange
98, 105 Spring cover
106 Cover main body
106*p* Spacer contact surface
107 Cover flange
99*a*, 99*b*, 110 Jig
111 Clamping jig
112 Finger support rod
112*h* Hole
113 First finger
113*t* First tapered surface
114 Second finger
114*t* Second tapered surface
115 Pressing rod
HG Exhaust gas
HP Exhaust flow path
S1 First outer space
S2 Second outer space
S3 Frame-to-relief surface space
Pr Planned disposition position
SR Seal plate group row
Ar Axis
Ac Central axis
Da Axial direction
Dau Axial upstream side
Dad Axial downstream side
Dc Circumferential direction
Dr Radial direction
Dri Radial inner side
Dro Radial outer side
Dac Central axis direction

What is claimed is:

1. An exhaust system comprising:

a first outer diffuser having a cylindrical shape centered on an axis and defining an edge on a radial outer side of an upstream portion of an exhaust flow path through which an exhaust gas which has rotated a turbine rotor passes;

a second outer diffuser disposed on an axial downstream side, between an axial upstream side and the axial downstream side, of the first outer diffuser with a gap therebetween in an axial direction in which the axis extends, having a cylindrical shape centered on the axis, and defining an edge on the radial outer side of a downstream portion of the exhaust flow path through which the exhaust gas having passed through the inside of the first outer diffuser passes;

an exhaust casing having a cylindrical shape centered on the axis and covering an outer circumferential side of the first outer diffuser;

an exhaust chamber having a cylindrical shape centered on the axis and covering an outer side of the second outer diffuser;

a first annular seal device having an annular shape centered on the axis;

a second annular seal device having an annular shape centered on the axis; and a third annular seal device having an annular shape centered on the axis, wherein the exhaust casing includes:

an exhaust casing main body having a cylindrical shape centered on the axis; and an exhaust casing flange extending from an end of the exhaust casing main body on the axial downstream side to the radial outer side with respect to the axis, the exhaust chamber includes:

an exhaust chamber main body having a cylindrical shape centered on the axis; and an exhaust chamber flange extending from an end of the exhaust chamber main body on the axial upstream side to the radial outer side to be connected to the exhaust casing flange, the first annular seal device is provided in the first outer diffuser to suppress an inflow of the exhaust gas into a first outer space between the first outer diffuser and the exhaust casing main body, the second annular seal device is provided in the second outer diffuser to suppress an inflow of the exhaust gas into a second outer space between the second outer diffuser and the exhaust chamber main body, the third annular seal device is disposed between the first annular seal device and the second annular seal device in the axial direction, and the third annular seal device is provided at an end of the first outer diffuser on the axial downstream side to suppress a flow of the exhaust gas to a side of the first annular seal device, or is provided at an end of the second outer diffuser on the axial upstream side to suppress a flow of the exhaust gas to a side of the second annular seal device.

2. The exhaust system according to claim 1, wherein the third annular seal device includes a plurality of third seal assemblies aligned in a circumferential direction with respect to the axis, and the plurality of third seal assemblies each include:

a seal plate extending in a radial direction with respect to the axis and the circumferential direction;

an inner frame supporting an edge of the seal plate on a radial inner side with respect to the axis; and an outer frame supporting an edge of the seal plate on the radial outer side.

3. The exhaust system according to claim 2, wherein the third annular seal device is provided at an end of the second outer diffuser on the axial downstream side to suppress a flow of the exhaust gas to a side of the second annular seal device, the exhaust casing flange includes:

a connection portion having an exhaust casing contact surface which is in contact with the exhaust casing flange; and a relief portion having an exhaust casing relief surface positioned on the radial inner side and the axial upstream side with respect to the exhaust casing contact surface, the exhaust chamber flange includes:

a connection portion having an exhaust chamber contact surface which is in contact with the exhaust casing contact surface; and a relief portion having an exhaust chamber relief surface which is positioned on the radial inner side and the axial downstream side with respect to the exhaust chamber contact surface and faces the exhaust casing relief surface with a gap therebetween in the axial direction, and the outer frame of each of the plurality of third seal assemblies is disposed between the exhaust casing relief surface and the exhaust chamber relief surface to be movable in the radial direction.

4. The exhaust system according to claim 3, wherein the third annular seal device includes a spacer disposed in a frame-to-relief surface space between the outer frame of each of the plurality of third seal assemblies and the exhaust chamber relief surface, and restricting movement of the outer frame of each of the plurality of third seal assemblies in the axial direction while allowing movement of the outer frame in the radial direction.

5. The exhaust system according to claim 4, wherein the second annular seal device includes a second member disposed in the frame-to-relief surface space and provided to be immovable relative to the exhaust chamber, and the third annular seal device includes a spacer movement retainer increasing a frictional force between the spacer and the second member to suppress movement of the spacer in the radial direction and the axial direction.

6. The exhaust system according to claim 5, wherein the first annular seal device includes a first member facing the spacer with a gap therebetween in the axial direction and provided to be immovable relative to the exhaust casing, and the spacer movement retainer includes:

a spring generating an elastic force in the axial direction;

a spring support frame covering an end of the spring on one side (the axial upstream side) in the axial direction and in contact with the first member; and a spring cover covering an end of the spring on the other side in the axial direction and in contact with the spacer.

7. The exhaust system according to claim 6, wherein the spring support frame includes a frame main body covering an end of the spring on the one side in the axial direction, and a frame flange, the frame main body has a member contact surface which is in contact with the first member, the frame flange is positioned on the other side in the axial direction with respect to the member contact surface and protrudes in the circumferential direction from the frame main body, the spring cover includes a cover main body covering an end of the spring on the other side in the axial direction, and a cover flange, the cover main body has a spacer contact surface which is in contact with the spacer, the cover flange is positioned on the one side in the axial direction with respect to the spacer contact surface, and protrudes in the circumferential direction from the cover main body, and the cover flange faces the frame flange with a gap therebetween in the axial direction.

8. The exhaust system according to claim 6, wherein a recessed portion recessed in the axial direction and into which some of the spring cover fits is formed in the spacer.

9. The exhaust system according to claim 3, wherein the inner frame of each of the plurality of third seal assemblies is fixed to an end of the first outer diffuser on the axial downstream side by welding.

10. The exhaust system according to claim 2, wherein the seal plate of at least one third seal assembly of the plurality of third seal assemblies has a length in the circumferential direction of an edge on the radial outer side which is the same as a length in the circumferential direction of an edge on the radial inner side, and the seal plate of the other third seal assemblies of the plurality of third seal assemblies excluding the at least one third seal assembly has a length in the circumferential direction of an edge on the radial outer side which is larger than a length in the circumferential direction of an edge on the radial inner side.

11. A gas turbine comprising:

the exhaust system according to claim 1;

a compressor being able to compress air to generate a compressed air;

a combustor being able to burn fuel in the compressed air to generate a combustion gas; and a turbine being able to be driven by the combustion gas from the combustor, wherein the turbine includes:

a turbine rotor rotatable around the axis; and a turbine casing covering an outer circumference of the turbine rotor, the turbine rotor includes:

a rotor shaft extending in the axial direction with the axis as a center; and a plurality of turbine blade rows aligned in the axial direction at intervals in the axial direction and attached to the rotor shaft, the turbine casing covers an outer circumference of a portion of the turbine rotor in which the plurality of turbine blade rows are present, and the exhaust casing of the exhaust system is connected to an end of the turbine casing on the axial downstream side.

* * * * *